United States Patent [19]

Paton et al.

[11] Patent Number: 4,680,014

[45] Date of Patent: Jul. 14, 1987

[54] WELDER'S TRAINER

[75] Inventors: Boris E. Paton; Vsevolod V. Vasiliev; Valentin A. Bogdanovsky; Alexandr I. Baranov; Sergei N. Danilyak, all of Kiev; Viktor A. Schegolev, Moskovskaya; Vladimir A. Chernoivanov, Kaliningrad; Vitaly I. Voloshin, Zhitomir; Viktor M. Gavva; Vsevolod N. Bernadsky, both of Kiev, all of U.S.S.R.

[73] Assignee: Institute Problem Modelirovania v Energetike a An USSR, Kiev, U.S.S.R.

[21] Appl. No.: 801,873

[22] Filed: Nov. 26, 1985

[51] Int. Cl.[4] .............................. G09B 19/24
[52] U.S. Cl. .................................... 434/234
[58] Field of Search .......................... 434/234

[56] References Cited

U.S. PATENT DOCUMENTS 4,124,944 11/1978 Blair .................................. 434/234

FOREIGN PATENT DOCUMENTS 1455972 11/1976 United Kingdom .
980124 12/1982 U.S.S.R. .
1038963 8/1983 U.S.S.R. .

Primary Examiner—Leo P. Picard
Attorney, Agent, or Firm—Fleit, Jacobson, Cohn & Price

[57] ABSTRACT

The welder's trainer comprises an welding electrode simulator, an electric-arc welding heat balance electronic model, a welding situation visual synthesis electronic model, a welding situation simulator made in the form of a television-type display, to which the welding situation visual synthesis electronic model is connected, and a training control and monitoring unit connected to the display through the visual synthesis electronic model.

31 Claims, 21 Drawing Figures

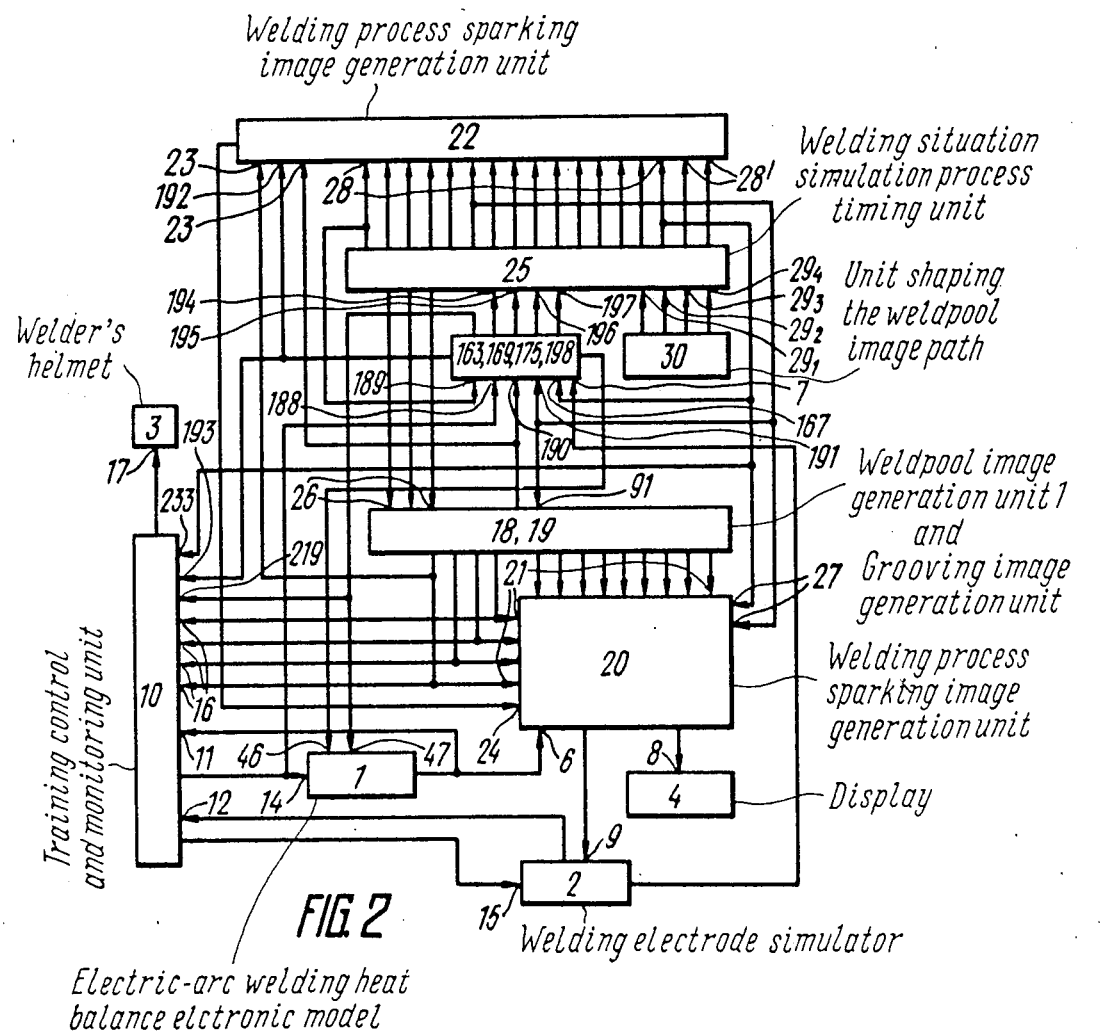

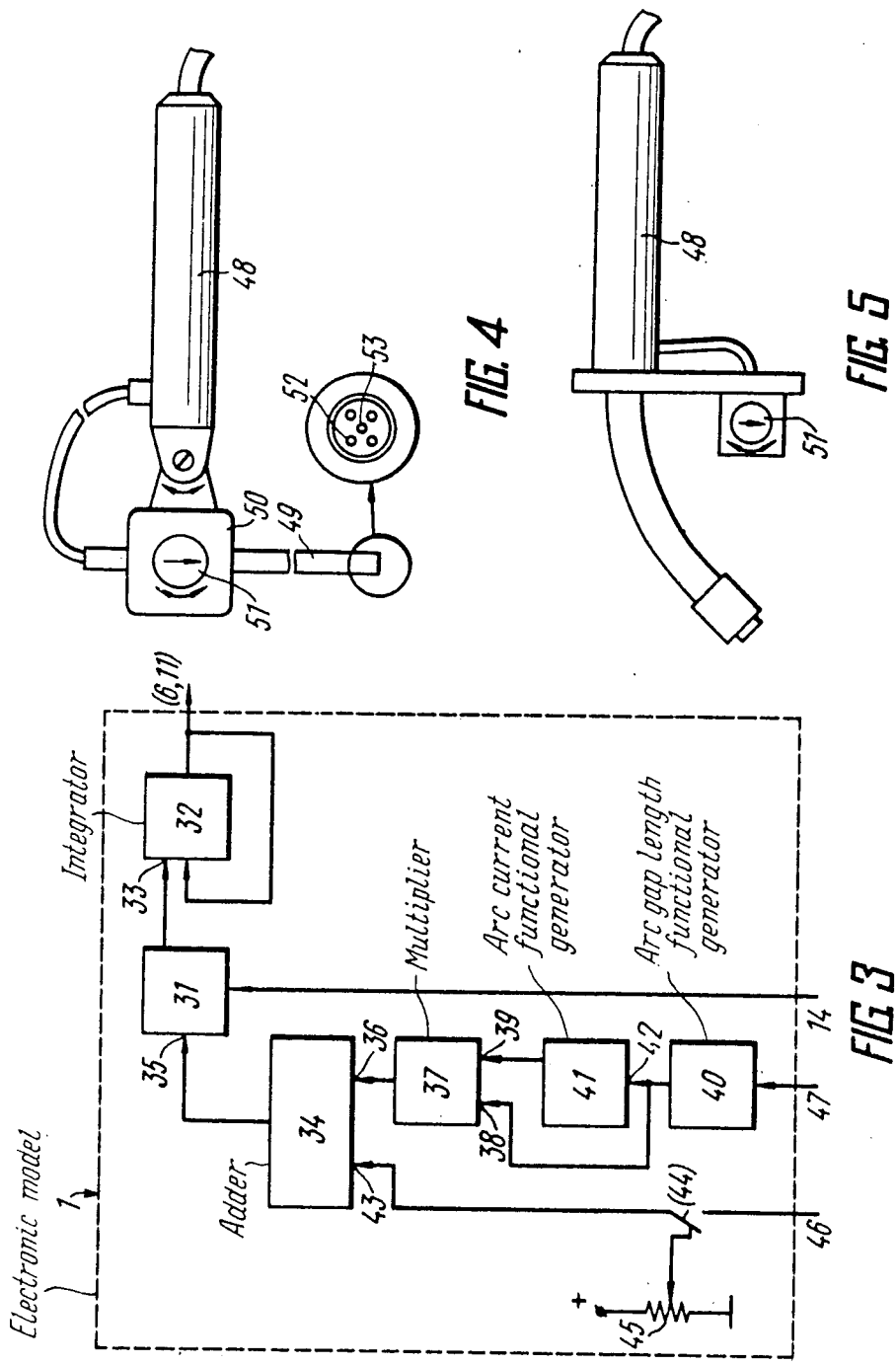

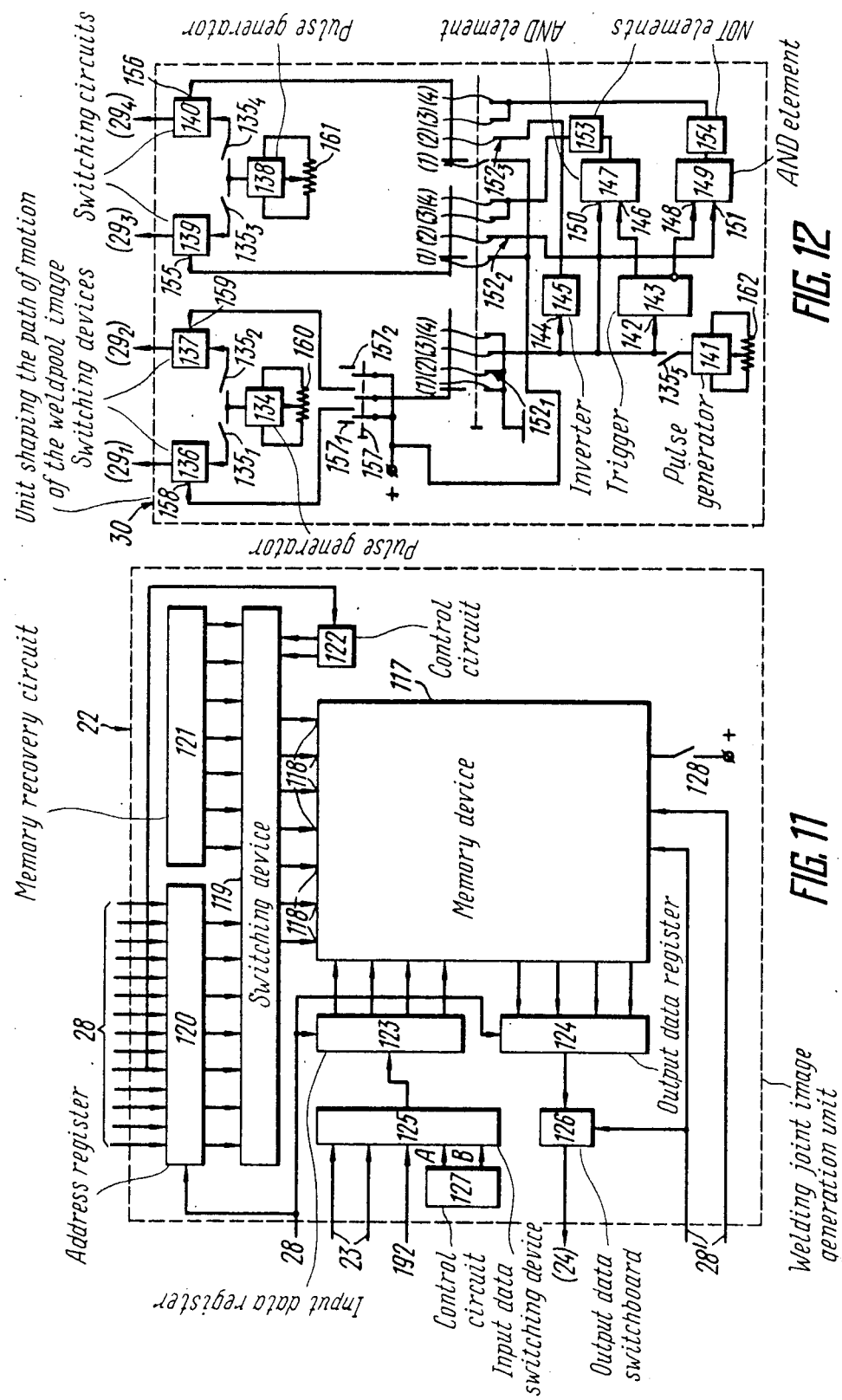

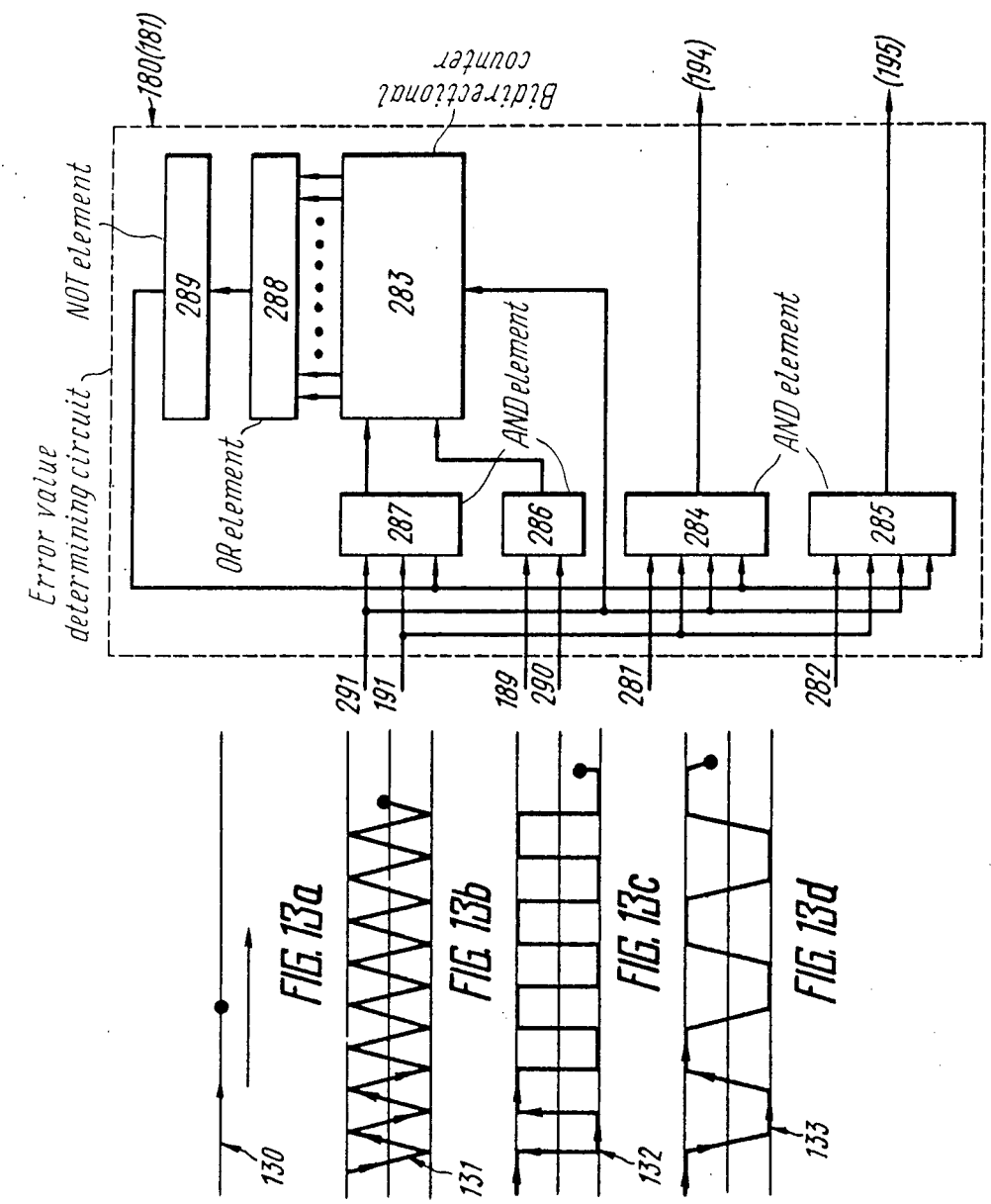

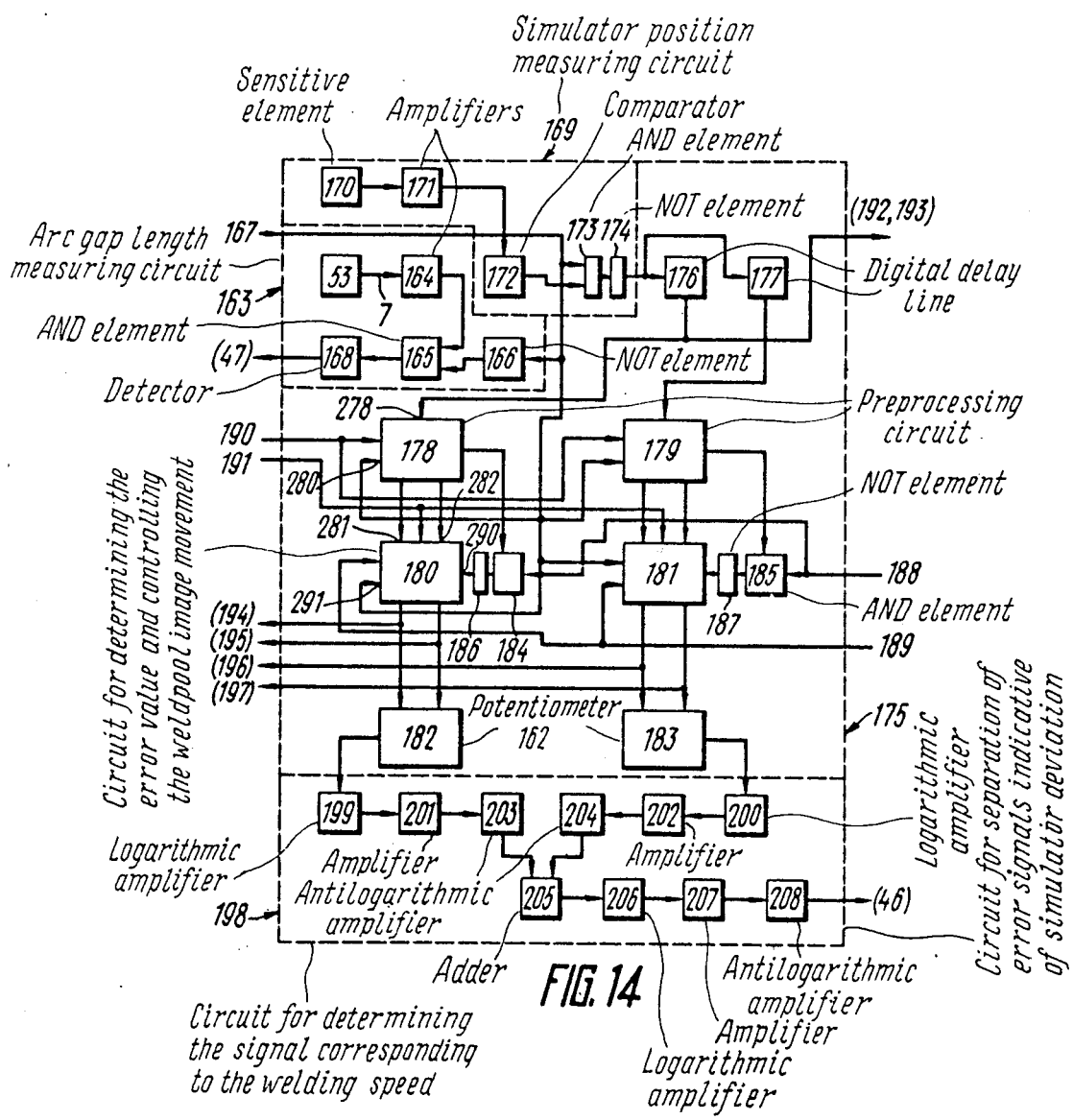

WELDER'S TRAINER

FIELD OF THE INVENTION

The present invention relates to tool handling teaching means and, more particularly, the invention relates to welder's trainers.

This invention may be used as technical means for training welders to master the manual and semi-automatic electric-arc welding operations.

BACKGROUND OF THE INVENTION

Known in the art is a welder's training simulator comprising mechanisms modeling the motion of a weldpool relative to a simulated member and the decrease in the length of a rod electrode, and circuits producing appropriate signals and recording the actions of the worker being trained. In this trainer the welded member simulator includes a movable target simulating a weldpool and a photoelectric cell that can move along the joint by a straight line or zigzag-like. The electrode holder simulator is equipped with an electrode simulator, a transducer responding to the arc gap length and an electrode simulator setting angle sensor. The end of the electrode simulator is provided with a protruding adapter made of a transparent material which simulates the length of the arc between the electrode simulator end and the simulated welded member, said electrode simulator having a light source for illuminating said adapter. The adapter is capable of moving to switch on a sensor having a permissible arc gap length as a preset parameter.

This sensor is a switch having a pair of contacts while the adapter moves so tht the movable contact makes connection with any of the above mentioned contacts located at both ends of its path, said pair of contacts being controllable with respect to the movable contact of the adapter for changing the parameters. The trainer also comprises a signal lamp, an audio-frequency generator simulating light and noise background of an electric arc welding process and sending an alarm signal on breaking a preset length of the arc gap (cf. British Pat. No. 1,455,972, IPC G09 B 9/00, 1976, Harvey Bordsen Schow and Maeyl Abrams).

The known trainer has a disadvantage consisting in incorrect simulation of the welding process due to utilization of the threshold sensor of the arc gap length having a mechanical contact between the electrode simulator end and the welded member simulator. This results in working out incorrect technique of tought persons and reduces the quality of their training.

Also known in the art is a trainer, which comprises a helmet with built-in headphones an electrode simulator with a holder, equipped with a device sensing the angular position of the electrode simulator, a drive simulating the electrode fusion, a permanent magnet at the end of the electrode simulator, a target unit with a movable carriage having a drive and simulating a movable weldpool. Mounted on the carriage are Hall generators recording the length of the arc gap, deviation from the target center and the speed of the end of the electrode simulator, and a signal lamp simulating the arcing. The trainer also comprises a control unit which records the disturbance of the preset length of the arc gap, angular position of the electrode simulator and speed of the end of the electrode simulator (cf. U.S. Pat. No. 4,124,944, IPC G09 B 19/24, published in 1978, Blair Bruce A.).

The disadvantage of the above trainer is that it simulates only the ambient factors accompanying the process of welding, devices senses the length of the arc gap and the angle of slope of the electrode simulator are threshold sensors, which have poor noise immunity against external electromagnetic fields; the accuracy of indication of the device sensing the arc gap length depends on the angle of slope of the electrode simulator and this results in working out incorrect psychomotor habits of the welder being trained.

Known in the art is a trainer disclosed in USSR inventor's certificate No. 1,038,963, IPC G09 B 19/24, published in 1983, the inventors: V. V. Vasiliev, S. H. Danilyak, N. A. Ropalo.

This trainer comprises a helmet with built-in headphones, an electrode simulator with a holder, a control unit, a unit for modeling the heat balance of a welding process, a target unit, and a unit for recording the space position of the electrode; the electrode simulator is made in the form of a hollow cylinder containing the radiating and receiving elements of devices sensing the arc gap length, slope angle of the electrode and its deviation from the target center; the outputs of said elements are connected to the electrode space position recorder connected to the control unit and to the unit for modeling the heat balance.

Also known in the art is a trainer disclosed in USSR inventor's centificate No. 980124, IPC G09 B 18//24, published in 1982, inventors: B. E. Paton, G. E. Pukhov, V. V. Vasiliev, V. A. Bogdansky.

This trainer comprises a helmet with built-in headphones, an electrode simulator with a holder, a drive for simulation of electrode end fusion, a permanent magnet at the electrode end, a target unit with a movable carriage containing a lamp with two filaments and provided with a drive for simulation of a movable weldpool, and a unit building up a heat balance electronic model. Mounted on the carriage are Hall generators for recording the arc gap length, deviation of the end of the electrode simulator from the target center and speed of the end of the electrode simulator; a signal lamp whose first filament is used for simulation of the arcing while the second filament is used for simulation of the thermal processes taking place in the weldpool; said lamp is connected to the enthalpy signal output of the unit providing the heat balance electronic model. The trainer includes a control unit responding to disturbance of a preset value of arc gap length, angular position of the electrode simulator, its speed and the weldpool thermal conditions.

These two trainers are disadvantageous in a low efficiency of the training and limited functional possibilities since the trainer does not provide simulation of such factors of a real welding process as a change of the size and brightness of the weldpool in the process of welding simulation, simulation of grooving of the simulated welded components with a possibility of changing the weldpool parameters, simulation of flying sparks and simulation of a welding joint image which might be used for estimating the path of movement of electrode simulator end and the quality of the conducted simulated welding process, as well as burn-out and incomplete penetration. The known trainers are based on strictly linear configuration of the joint and they cannot be used for training to the art of making curvilinear and multipass joints. The known trainers are intended for teaching the welding with stick electrodes and they cannot be used for training of a welder to employ electrode wire in an inert gas medium because a hand tool simulator is not provided. This restricts the field of application of the known trainers and their functional facilities. The trainers cannot operate under self-teaching conditions when the weldpool tracks the position of the electrode simulator end; instead, the trainers provide a program training mode when the welder follows the position of the weldpool with the electrode, and this also limits the possibility of application of the trainers for checking the professional ability and skill of welders.

BRIEF DESCRIPTION OF THE INVENTION

An object of the present invention is to provide a welder's trainer which would make it possible to improve the results of the psychomotor habits corresponding to a welding process.

Another object of the invention is to provide a welder's trainer which would make it possible to simulate and monitor of many factors of a real welding process.

Still another object of the invention is to widen the field of application of a trainer.

Yet another object is to increase the training efficiency.

Another object of the invention is to provide a welder's trainer which would make it possible to completely and accurately check the results of the psychomotor activity of the taught person.

Another object of the invention is organization of a system of audio and video feedback signals to the welders to indicate that the simulated welding process is being performed correctly.

These and other objects are attained by providing a welder's trainer comprising a welding situation simulation unit, a welding electrode simulator, a welding process heat balance electronic model, and a training control and monitoring unit connected to the welding electrode simulator, to heat balance electronic model and to the welding situation simulator, in which, according to the invention, the welding situation simulation unit is made in the form of TV-type display to which an electronic model for visual synthesis of the welding situation on the display screen is connected; the welding situation simulating unit is connected to the trainer monitoring and control unit through this visual synthesis electrode model.

It is preferable that the electronic model of visual synthesis of the welding situation on the display screen comprises a unit for generation of a weldpool image whose output is connected to the input of the control and monitoring unit, a unit for generation of a grooving image, a unit for generation of a welding process sparking image whose input is connected to the output of the weldpool generation image unit, to the output of the heat balance electronic model, while the output is connected to the welding electrode simulator input and to the display, and a welding joint image generation unit whose input is connected to the output of weldpool image generation unit, while the output is connected to the input of the welding process sparking image generation unit.

It is also preferable that the visual synthesis electronic unit comprises a welding situation simulation process timing unit whose outputs are connected to the inputs of the units for generation of images of the weld pool, welding joint and welding process sparking process; in addition, a unit for indication of the weldpool image path of motion connected to the welding situation simulation process timing unit, and a circuit for separation of error signals of deviation of the welding electrode simulator from the center of the weldpool image on the display screen connected to the trainer control and monitoring unit, timing unit and units for generation of weldpool and welding joint images; a circuit for determining the position of the welding electrode simulator relative to the display screen connected to the input of the error signal separation circuit; a circuit for determining a signal corresponding to the welding speed whose input is connected to the output of the error signal separation circuit while the output is connected to the welding process heat balance electronic model.

It is expedient that the visual synthesis electronic model comprises a welding process simulation timing unit whose outputs are connected to the inputs of the units for generation of images of the weldpool, welding joint and welding process sparking; furthermore the trainer includes a unit for generation of an image of the path of motion of the weldpool image connected to the input of the welding situation simulation timing unit; a circuit for separation of error signals on a deviation of the welding electrode simulator from the center of the weldpool image on the display screen connected to the training control and monitoring unit, timing unit and units for generation of images of the welding joint and weldpool; a circuit for determining the position of the welding electrode relative to the display screen connected to the input of the error signal separation circuit; a circuit determining the signal corresponding to the welding speed whose input is connected to the output of the error signal separation circuit, while the output is connected to the welding process heat balance electronic model.

A weldpool image generation unit may include a weldpool image former, a welding pool center image former, a raster horizontal sampling counter, a raster vertical sampling counter whose outputs are connected to the inputs of the weldpool image generation unit, two AND elements the output of each of them is connected to the input of the respective counter, and two triggers for starting the raster of the weldpool image, one input of each of them is connected to the input of the respective counter, while the output of each trigger is connected to one input of the respective AND element, the other input of each AND element and of each trigger being an input of the whole weldpool image generation unit, while the outputs of the image generator and a part of the outputs of each counter being the outputs of the whole unit.

It is expedient that the grooving image generation unit comprises a grooving image former, a counter of horizontal raster sampling of the grooving image and a counter of vertical raster sampling of the grooving image whose outputs are connected to the inputs of grooving image former, two AND elements, the output of each of which is connected to the input of a respective counter, and two triggers for triggering the grooving image raster, one input of each of which is connected to the output of a respective counter, while the output of each trigger is connected to one input of a respective AND element; the other input of each AND element and each trigger is an input of the whole weldpool image generation unit, while the output of a former and a part of the outputs of each counter are outputs of the whole unit.

It is also expedient that the welding process sparking image generation unit comprises a sparking path former, a sparking position counter whose outputs are connected to the inputs of the sparking path former, and pseudo-random pulse train generator whose output is connected to the input of the sparking path former, the output of said former is an output of the whole unit; the welding joint image generation unit preferably comprises a memory device whose inputs are connected to the address register and to the output data switching device having a control circuit, and an output data switching device connected to the output of said memory device, while the welding process situation simulator preferably comprises a master pulse generator, a horizontal raster sampling counter and a vertical raster sampling counter connected in series.

Furthermore, it is expedient that the welding situation simulation timing unit comprises a microraster horizontal position counter, a microraster vertical position counter, the outputs of each of which are connected digitwise to the first inputs of respective comparison circuits whose second inputs are connected digitwise to the outputs of the horizontal and vertical raster sampling counters respectively, while the outputs of each comparison circuit are connected digitwise to the inputs of corresponding AND elements whose outputs are data outputs of the whole timing unit, and a switching device for controlling the microraster movement having an operating mode selector and having outputs connected in pairs to the inputs of the horizontal and vertical microraster position counters respectively.

It is expedient that the unit for shaping the path of motion of the weldpool image comprises a pulse generator producing pulses corresponding to the speed of the weldpool image along the horizontal axis whose output is connected through a starting switch to a first pair of switching circuits, a pulse generator producing pulses corresponding to the speed of the weldpool image along the vertical axis whose output is connected through the same starting switch to a second pair of switching circuits, a pulse generator producing pulses corresponding to the step of motion of the weldpool image whose output is connected through the starting switch to the input of a trigger and to the input of an inverter the direct output of said trigger is connected to the first input of the first AND element while the inverse output of said trigger is connected to the first input of a second AND element; the second outputs of the AND elements are connected to the pulse generator producing pulses corresponding to the step value through the starting switch, and a weldpool image path switch connected to the outputs of the pulse generator producing pulses corresponding to the step value, the inverter and AND elements, through NOT elements to the control inputs of the second pair of switching circuits and through a weldpool image motion direction switch is connected to the control inputs of the first pair of switching circuits.

It is reasonable that the circuit for determining the position of the welding electrode simulator with respect to the display screen comprises a sensing element whose output is connected through an amplifier to a comparator, while the error signal separation circuit comprises channels for processing the data along the horizontal and vertical, each of which includes the following elements connected in series: a digital delay line, a preprocessing circuit, a circuit for determining the value of the error and for controlling the weldpool image motion, and a digital-to-analog converter whose output along with the outputs of the error determining circuit are data outputs of the error signal separation circuit.

It is useful that the circuit for determining the signl corresponding to the welding speed comprises two logarithmic amplifiers, each of which is connected through an amplifier and an antilogarithmic amplifier to the input of an adder whose output is connected through a third logarithmic amplifier and an amplifier to the input of a third antilogarithmic amplifier.

Then it was found most reasonable that the electronic model of visual synthesis of the welding situation comprises a video mixer whose output is connected to the display, while the inputs are connected to the welding process heat balance electronic model, weldpool image generation unit, edge preparation image generation unit, welding sparking image generation unit, welding joint image generation unit, and to the welding situation simulation process timing unit.

It was found practical that to the output of the video mixer there is connected a circuit for controlling the weldpool image luminance depending on the thermal conditions of the welding process.

Furthermore, it was found most preferable that in the trainer, in which the training control and monitoring unit includes an arc gap length channel, a welding electrode simulator, a slope angle channel, a working time measuring channel, a welding cycle time measuring channel, an alarm signal and audio background oscillator, an electrode fusion simulation drive control channel, and a pulse generator, according to the invention, the training control and monitoring unit may include a channel for determining the weldpool thermal conditions, a channel for determining the down-time, a channel for determining the time of sticking the welding electrode simulator, a channel for shaping an error signal by tracking the weldpool image.

Finally, the channel for shaping an error signal by tracking the weldpool image may have a circuit for separation of the error signal by tracking, which comprises a first AND element whose output is connected to the first input of a pulse counter, which direct and inverse outputs are connected to the input of a second AND element which output through a NOT element is connected to one input of a third AND element and to the output of the whole circuit, while the output of the third AND element is connected to the second input of the pulse counter, the inputs of the first AND element and the second input of the third AND element being connected respectively to the outputs of the weldpool image generation unit, to the circuit for separation of an error signal for switching off the welding electrode simulator and to the welding situation simulation process timing unit.

Also, it was found expedient that the preprocessing circuit comprises two triggers whose inputs are inputs of the whole circuit, while the outputs are connected in pairs to the inputs of a third trigger and a comparison circuit; the circuit for determining the error value and for controlling the weldpool image motion comprises a bidirectional counter whose output is connected digitwise to the inputs of an OR element, a NOT element, whose input is connected to the output of said OR element, and four AND elements, the outputs of two of which are connected to the inputs of the bidirectional counter while the outputs of the remaining two are outputs of the whole circuit; the inputs of all AND elements are connected to the output of the NOT element and to the outputs of the welding situation simulation timing unit.

The claimed welder's trainer makes it possible to essentially improve the process of imparting to the trainee the psychomotoric skills corresponding to welding operation.

The other objects and inherent advantages of the present invention will be apparent from the following detailed description of some embodiments thereof with reference to the accompanying drawings, in which:

FIG. 2 shows a detailed block diagram of the same welder's trainer;

FIG. 3 is a block diagram of the electronic model of the heat balance of an electric-arc welding process, according to the invention;

FIG. 4 shows the welding electrode simulator for welding with a stick electrode;

FIG. 5 shows the welding electrode simulator for welding with an electrode wire in an inert gas medium;

FIG. 11 is a block diagram of the unit for generation of a welding joint image, according to the invention;

FIG. 12 is a block diagram of the unit for shaping the path of the weldpool image, according to the invention;

Figure 15:
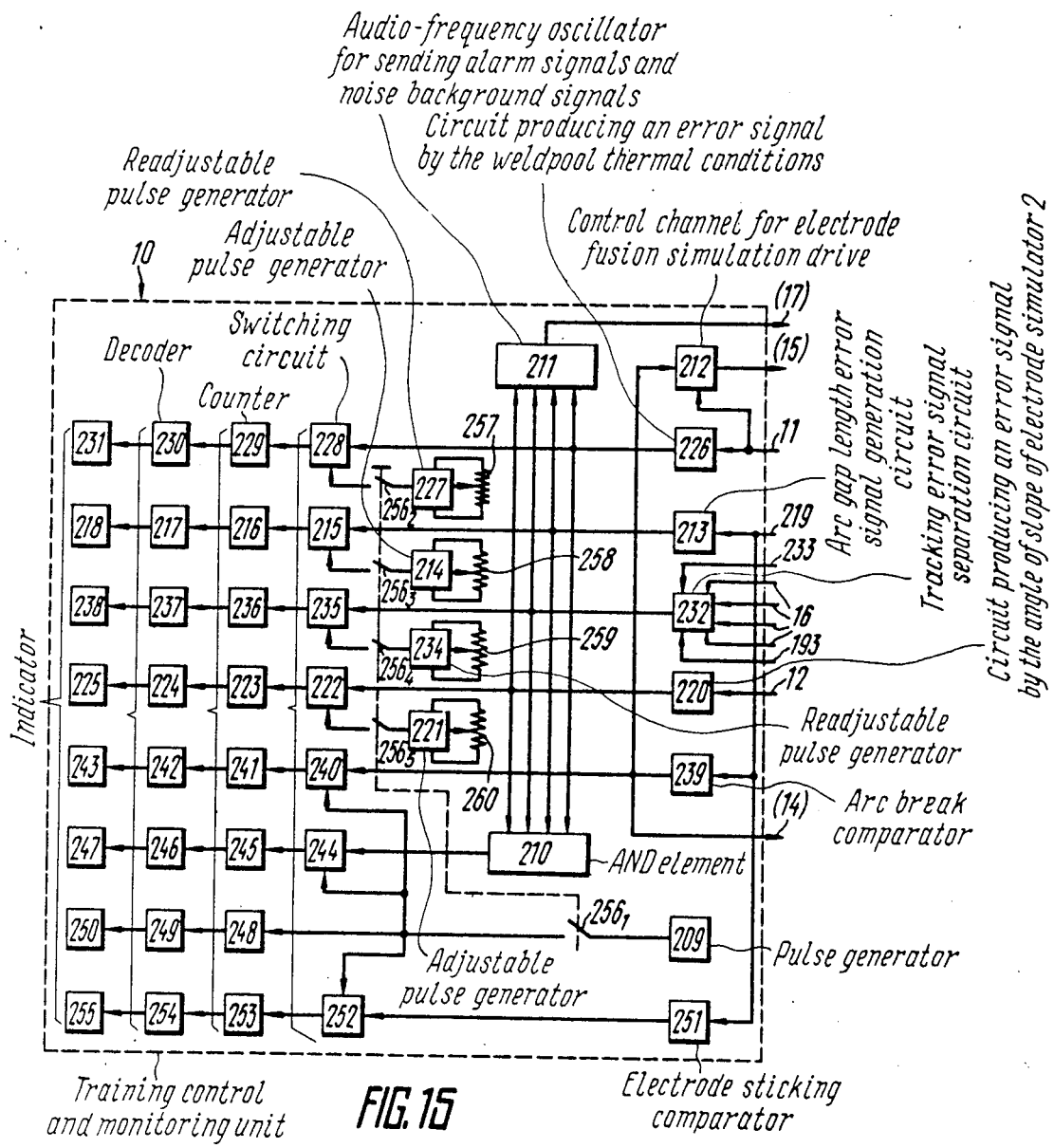
Figure 16:
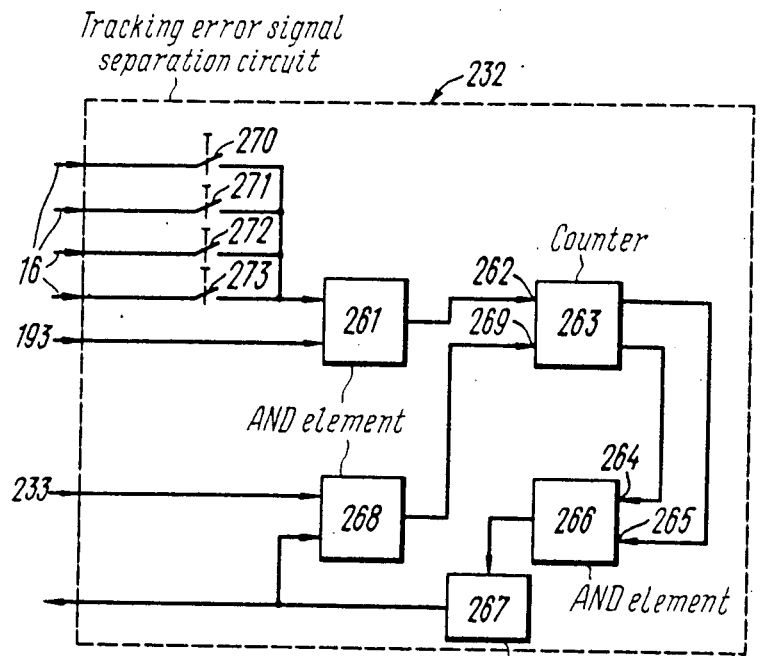
Figure 17:
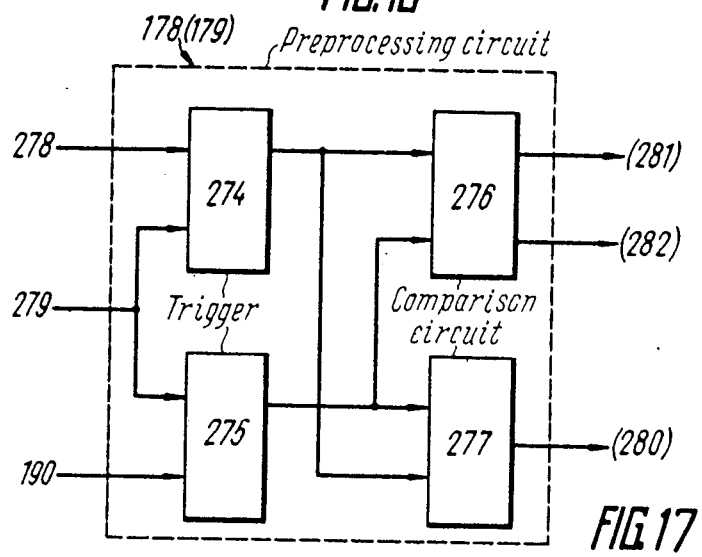

FIG. 13a, b, c, d shows possible paths of movement of the weldpool image on a display screen;

FIG. 14 shows schematic diagrams of measuring the arc gap length and determining the welding electrode simulator location, a schematic diagram of an error signal separation, and a schematic diagram of determining the signal corresponding to the welding speed, according to the invention;

FIG. 15 shows the training control and monitoring unit according to the invention;

FIG. 16 shows a schematic diagram of generation of a tracking error signal, according to the invention;

FIG. 17 is a block diagram of the signal preprocessing circuit, according to the invention;

FIG. 18 shows a schematic diagram of the circuit for measuring the error value and for controlling the weldpool image motion, according to the invention.

DETAILED DESCRIPTION OF THE INVENTION

The claimed welder's trainer is designed for initial training, admission-for-job test and skill test of welders. The trainer allows one to save welding materials, electrodes and electric power spent in the process of training with a real welding process. What is more, the trainer makes it possible to reduce a number of traumatic injuries of the beginner welders, reduce the training course term and improve the training quality.

The welder's trainer includes a welding process heat balance electronic model 1, a welding electrode simulator 2, a welder's helmet 3, a welding situation simulation unit made in the form of a TV-type display 4, and an electrode model 5 of visual synthesis of the welding situation on the screen of the display 4, to the inputs 6 and 7 of which there are connected the output of the heat balance electronic model 1 and welding electrode simulator 2, while the outputs of the electronic model 5 are connected to the inputs 8 and 9 of the display 4 and simulator 2.

The trainer also comprises a training control and monitoring unit 10 which inputs 11, 12 and 13 are connected to the outputs of the heat balance electronic model 1, simulator 2 and electronic model 5 respectively, while the outputs of the unit 10 are connected to the inputs 14, 15, 16, and 17 of the heat balance electronic model 1, welding electrode simulator 2, electronic model 5 and helmet 3 respectively.

According to the invention, the welding situation visual synthesis electronic model 5 comprises a weldpool image generation unit 18 (FIG. 2) whose output is connected to the input 16 of the control unit 10, a grooving image generation unit 19 made integral with the unit 18, a welding process sparking image generation unit 20 connected through its input 21 to the output of the unit 18 and connected through the input 6 to the electronic model 1, while the output of this unit is connected to the input of the display 4 and to the input 9 of the welding electrode simulator 2.

The model 5 also includes a welding joint image generation unit 22 connected through its inputs 23 to the output of the unit 18 and connected through its output to the input 24 of the unit 20, a welding situation simulation process timing unit 25 connected through its outputs to the input 26 of the unit 18, to the input 27 of the unit 20 and to the inputs 28 of the unit 22, while the inputs of the unit 25 are connected to the outputs of a unit 30 shaping the path of motion of the weldpool image.

The electronic model 1 is used for solving the thermal conductivity equation in the form of a derivative differential equation corresponding to the balance of heat supplied into a volume under discussion from a welding heat source and the heat transferred out of the volume by kinds of heat transfer (heat conduction, convection, radiation, etc.). A simplified mathematical description of the heat balance is written in the form:

$$db/dt + D \cdot h + (RV - kUI\eta) \cdot \sigma = 0 \qquad (1)$$

$$n = a + bl \qquad (2)$$

$$I = \psi(u) \qquad (3)$$

wherein
h is the welding zone enthalpy;
V is the welding speed;
U is the electric arc voltage;
I is the electric arc current;
l is the length of the arc gap;
a, b, D, R, k, $\eta$ are the constants depending on the type and operating conditions of the welding, geometric size and thermal properties of the electrode and components to be welded;
$\sigma$ is the alarm signal indicating on breaking of normal operating conditions of the welding;
$\sigma = 0$ if the operating conditions are disturbed;

σ=1 if the welding is effected under normal conditions.

The heat balance model in accordance with equations (1) to (3) may be based on any circuit known in the art.

One of possible embodiments of the model 1 is shown in FIG. 3.

The model 1 comprises an electronic switch 31, an integrator 32 having a feedback circuit. The input 33 of the integrator 32 is connected to the output of the electronic switch 31, while the output of the integrator 32 is a data output of the heat balance model 1. The model 1 comprises an adder 34 which output is connected to the input 35 of the electronic switch 31, while the input 36 of the adder 34 is connected to a multiplier 37, the inputs 38 and 39 of which are connected respectively to a functional generator 40 for measuring the electric arc gap and to a functional generator 41 for measuring the electric arc current. The output of the generator 40 is connected to the input 42 of the generator 41. A potentiometer 45 or the input of the model 1 is connected to the input 43 of the adder 34. The other input 47 of the model 1 is a data input of the functional generator 40 for measuring the electric arc gap.

The electronic switch 31 is used for cutting off the signals simulating the welding speed and electric arc current. This corresponds to the last two terms of equation (1) when an alarm signal is generated. The electronic switch 31 may be made in the form of a transistor circuit breaker.

The functional generator 40 for measuring the electric arc gap length is used for generation of a signal of the arc voltage in accordance with equation (2).

The functional generator 41 for measuring the electric arc current is intended for realization of the external characteristic of the welding current source in accordance with equation (3).

The potentiometer 45 is used for setting the voltage corresponding to a definite welding speed in a program training mode ("Tracking").

The switch 44 is used for switching the welding speed input signals under two operating conditions of welders' training program ("Tracking") and self-learn ("Welding").

The simulator 2 is designed for simulation of a real hand tool used in the welding practice and comprises a simulator for welding with a stick electrode (FIG. 4) and a simulator for welding with electrode wire in a protective gas medium (FIG. 5).

The simulator according to FIGS. 4, 5 comprises an electrode simulator holder 48, an electrode simulator 49, a drive 50 for simulation of electrode fusion, and a slope angle sensor 51 of the gravitational type.

The electrode simulator 49 is hollow and has at its end four emitting elements 52 and a sensing element 53 of an arc gap length sensor which may be built around any circuit known in the art.

Figure 1:
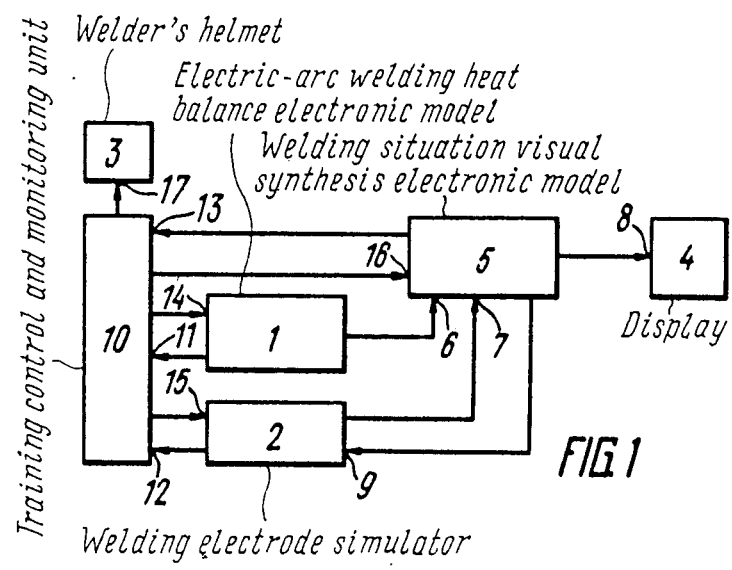
FIG. 1 shows a block diagram of the welder's trainer, according to the invention.

The sensing element 53 is a receiving element of the arc gap length sensor and is used for reception of optical radiation reflected from the screen of the display 4 (FIG. 1).

The helmet 3 may be of any design known in the art and is a standard in size and appearance welder's helmet provided with headphones having a volume control. These elements are not shown in the drawings.

The unit 25 (FIG. 2) is used for generation of clock pulses for synchronizing the operation of all units of the trainer as well as for generation of a discrete TV raster, triggering a microraster and its movement on the screen of the display 4.

The unit 25 (FIG. 6) comprises the following components connected in series: a master pulse oscillator 54, a raster horizontal sampling counter 55 and raster vertical sampling counter 56. Furthermore, the unit 25 comprises a microraster horizontal position counter 57 and microraster vertical position counter 58; the outputs of the counters 57, 58 are connected to the inputs 59 and 60 of comparison circuits 61 and 62. The inputs 63 and 64 of these circuits 61 and 62 are connected to the outputs of the counters 55 and 56 respectively, while their outputs are connected to the inputs of 65 and 66 of AND elements 67 and 68 respectively. The outputs of the AND elements 67 and 68 are outputs of the whole unit 25, which also comprises a switching device 69 for controlling the microraster motion having operating mode selector switch 70 whose output is connected to the input of 71 of a switching device 69. Two outputs of the switching device 69 are connected to the inputs 73 of the counter 58. The inputs of the switching device 69 are the inputs 29 (FIG. 2) of the whole unit 25 and are connected to the outputs of the unit 30.

The master pulse oscillator 54 is used for generation of a continuous train of pulses with a repetition frequency of 8 MHz and it may be built around a well known circuit of a crystal-controlled square-wave generator.

The raster horizontal sampling counter 55 is used for line sampling of a television raster and generation of a train of pulse signals required for operation of the other units of the trainer. The raster horizontal sampling counter 55 may, for example, be based on a 9-digit binary counter.

The raster vertical sampling counter 56 is used for frame sampling of a television raster and generation of a train of pulse signals of a different frequency required for operation of the other units of the trainer. The counter 56 may be built around a 9-digit binary counter based on a well known circuit. The output of the higher-order digit of the raster horizontal sampling counter 55 is connected to the clock input of the lower-order digit of the raster vertical sampling counter 56. The counters 55 and 56 taken together form, for example, a 19-digit raster sampling counter, to each state of which corresponds a definite length of a television raster having duration of 125 ns.

The microraster horizontal position counter 57 is designed for recording the number determining the position of the microraster on the television raster and may consist of an 8-digit bidirectional counter built aroun a well known circuit.

The microraster vertical position counter 58 is used for recording the number determining the vertical position of the microraster on the television raster and may be built around a well known circuit, e.g. as an 8-digit bidirectional counter.

The comparison circuits 61 and 62 are intended for comparison of the values of the codes stored in the counters 57 and 58 and representing the horizontal and vertical positions of the microraster with a current address of the TV scanning beam and may be built around a well known circuit.

The elements 67 and 68 are intended for generation of signals for triggering the microraster along in the horizontal and vertical axes as soon as the codes at the inputs of the comparison 61 and 62 coincide.

The switching device 69 for controlling the microraster motion is designed for switching the control signals of the microraster horizontal and vertical position counters 57 and 58 in two operating modes: "Welding" and "Tracking".

Figure 7:
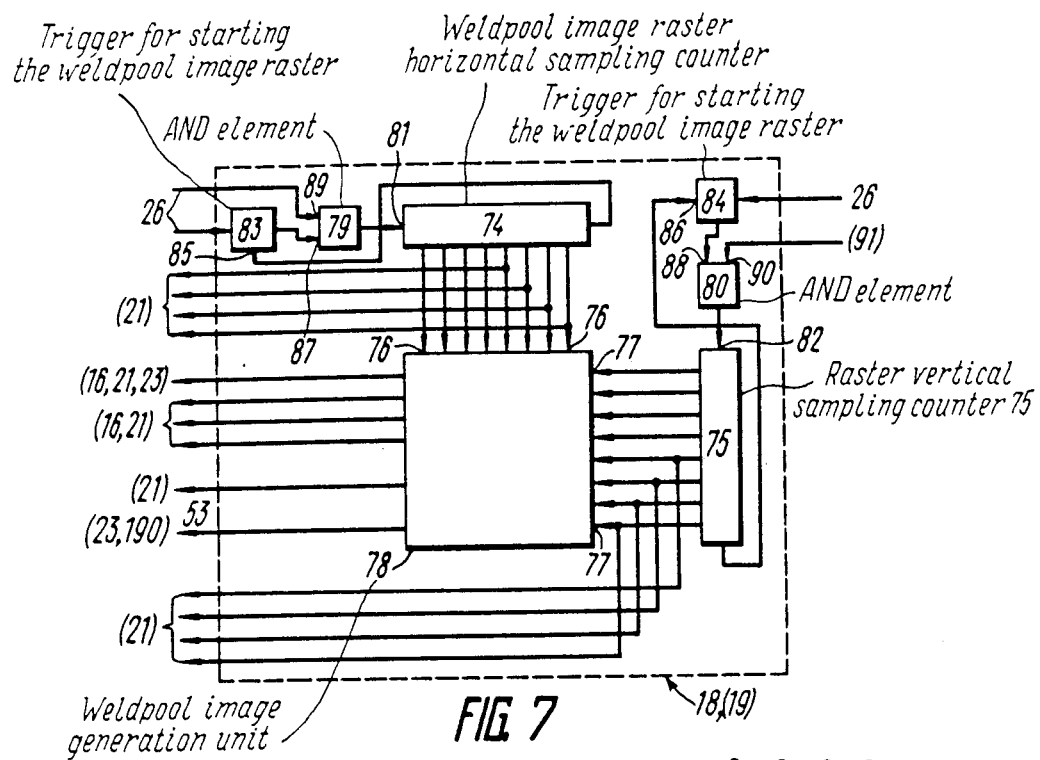
FIG. 7 is a block diagram of the units for generation of a weldpool image and a grooving image, according to the invention.
Figure 8:
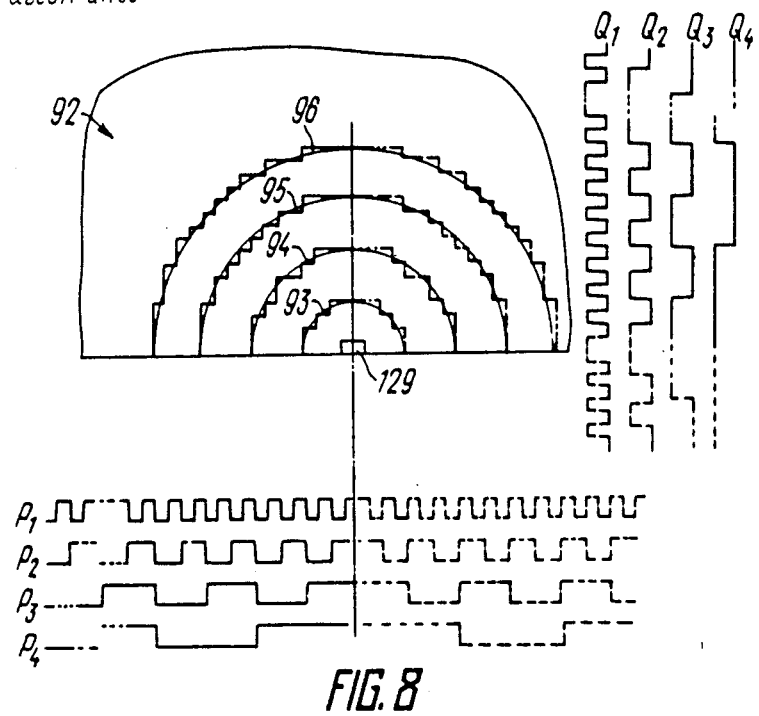
FIG. 8 shows the principle of generation of a weldpool image on a display screen, according to the invention.

The weldpool image generation unit 18 and grooving image generation unit 19 are intended for forming on a TV display a microraster, e.g. with a size of 256×256 points for generation of an image, for example, of four concentric circles simulating a weldpool in the center of the microraster, generation of a grooving image of the simulated components to be welded, and for forming a signal indicating the center of the simulated weldpool image. FIG. 7 shows a possible embodiment of the grooving image generation unit 19 and weldpool image generation unit 18, while FIG. 8 presents a schematic diagram illustrating the structure of the weldpool image on the screen of the display 4.

FIG. 7 shows a block diagram of the weldpool image generation unit 18. The block diagram of the unit 19 is identical and for sake of simplicity is not discussed in this specification.

According to the invention, the unit 18 comprises counters 74 and 75 (74' and 75') of horizontal and vertical sampling of the weldpool image raster, which are connected to the inputs 76 and 77 of the weldpool image generation unit 78 (78'), two AND elements 79 and 80 (79' and 80'), the outputs of each of which are connected to the inputs 81 and 82 of the counters 74 and 75 (74' and 75') respectively, and two triggers 83 and 84 (83' and 84') used for starting the weldpool image raster.

The inputs 85 and 86 of the triggers 83, 84 are connected to the outputs of the counters 74, 75, while their other inputs are data inputs 26 of the whole unit 18. The outputs of the triggers 83, 84 are connected to the inputs 87, 88 of the AND element 79, 80 which outputs 89 and 90 are data inputs of 26 and 91 (FIG. 2) of the unit 18.

A part of the outputs of the counters 74, 75 (FIG. 7) are outputs of the whole unit 18 connected to the inputs 21 (FIG. 2) of the unit 20; the outputs of the weldpool image generation unit 78 (78') (FIG. 7) are outputs of the whole unit 18 (19) connected to the inputs 16 and 21 (FIG. 2) of the units 10 and 20.

FIG. 8 illustrates how the images of concentric circles 93, 94, 95, 96 simulating the weldpool are formed on the screen of the display 4 (FIG. 2). The circles 93-96 are approximated by stepped lines, the approximation accuracy being defined by the frequency of sampling along the horizontal and vertical axes.

The counters 74 (74') and 75 (75') of horizontal and vertical sampling of the microraster may be made, for example, as 8-digit binary counters, each having a scaling factor equal to 256 (the number of points of the microraster in the horizontal and vertical directions) and may be based on a well known circuit.

The triggers 83, 84 (83', 84') are intended for starting the raster in the horizontal and vertical directions and may be built around a well known circuit.

The elements 79, 80 (79', 80') are intended for applying pulses with a frequency of 8 MHz and 15.625 kHz to the complementing input of the pulse counters 74, 75 during the operation of the raster starting triggers 83, 84.

The weldpool (grooving) image generation unit 78 (78') and the weldpool center image generation unit are combinational circuits designed for forming an image of four concentric circles simulating the weldpool (or for forming the grooving image) and for producing a signal designating the simulated weldpool center.

Figure 9:
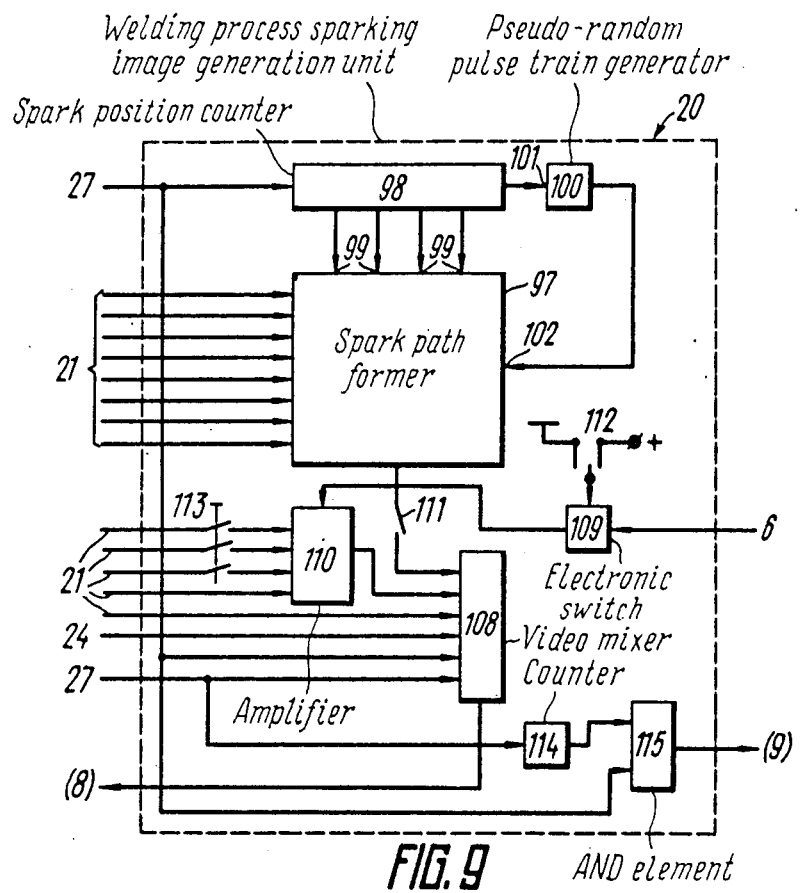
FIG. 9 is a block diagram of the unit for generation of a welding process sparking image, according to the invention.

The unit welding process sparking image generation unit 20 is designed for generation of an image of the sparks occasionally flying from the center of the simulated weldpool as well as for generation of composite video signal and pulses of the arc gap length sensor. FIG. 9 of this Application shows a possible embodiment of the unit 7 for forming an image of the sparks on the disply screen, said image being generated by means of the unit 20.

The unit 20 comprises a sparking path former 97, a part of whose inputs serve as inputs 21 of the whole unit 20, a spark position counter 98 whose outputs are connected to the inputs 99 of the former 98, a pseudo-random pulse train generator 100, to the input 101 of which the output of the counter 98 is connected, while its output is connected to the input 102 of the former 97.

The spark position counter 98 may consist, for example, of a 4-digit binary counter with a scaling factor of "16" and is designed for discrete lighting up the spark on the screen of the display 4 (FIG. 1) in the process of its movement along a corresponding path. The spark position counter 98 (FIG. 9) may be built around a well known circuit.

The pseudo-random pulse train generator 100 is designed for selection of a single path among the 12 possible paths of a flying spark and may be built around a well known circuit of similar generators. The clock input of the pseudo-random pulse train generator 100 is connected to the output of the higher-order digit of the spark position counter 98, while the output of this generator 100 is connected to the sparking path former 97.

The sparking path former 97 is designed for forming possible paths of flying sparks in the microraster and may be built around AND, NOT, OR elements and coincidence circuits using the well known methods of generation of dynamic images. The higher-order digits of the microraster horizontal and vertical sampling counters 74 and 75 (FIG. 8) are connected to first inputs of the elements 79, 80 whose second inputs are connected to the spark position counter 98.

Figure 10:
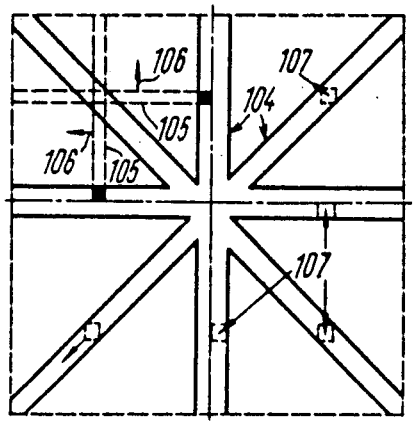
FIG. 10 illustrates the principle of generation of a sparking image on a display screen, according to the invention.

FIG. 10 shows a microraster 103 illustrating all twelve possible paths 104 of motion of sparks. The hatch lines in the upper left-hand square of the microraster 103 illustrate the motion of the band of sparks while the pointers 106 show the direction of their movement. It is clear that the intersection of these two bands we have a movable element 107 which moves along the diagonal line. The elements 107 obtained at the intersection of the movable and stationary bands (the hatched squares in FIG. 10) move along the horizontal and vertical paths. All elements 107 shown in FIG. 10 correspond to the same state of the spark position counter 98.

The unit 20 (FIG. 9) incorporates a video mixer 108 designed for generation of a composite video signal and made, for example, in the form of a summing-up amplifier and a circuit for controlling the weldpool luminance depending on the thermal conditions of the welding process. This circuit comprises an electronic switch 109 and an amplifier 110 with a gain control circuit for controlling the amplitude of the luminance signal of weldpool image proportional to the voltage corresponding to the weldpool temperature.

The electronic switch 109 is designed for controlling the voltage corresponding to the weldpool temperature in the "Welding"—"Tracking" operating mode of the trainer and may be based on a circuit known in the art.

The video mixer 108 is connected to the former 107 through a switch 111. Another switch 112 is mounted at the control input of the switch 109, while a switch 113 is mounted at the data inputs of the amplifier 110. The switches 111–113 are intended for switching the training operating mode "Welding"—"Tracking".

In addition, FIG. 9 shows a control circuit for controlling the radiation of the arc gap length sensor comprising a counter 114, an AND element 115 and at least one emitting element 52 (FIG. 4) connected in series. The signals from the timing unit 25 (FIG. 2) are applied to the input 116 (FIG. 9) of an element 115 and to the counter 108.

The counter 114 is designed for division of the line pulses by three and is made as a frequency divider.

The element 115 is designed for passing the pulses with a frequency 15.625:3 kHz to the emitting elements 52 of the arc gap length sensor during the passage of the frame timing pulse.

The welding joint image generation unit 22 is designed for storing the path of motion of the end of the simulator 49 (FIG. 4) during one sequence of operation of the trainer and for indicating this path on the screen of the display 4 (FIG. 2) for analysis of the quality of the conducted welding process.

The welding joint image generation unit 22, which includes a memory device 117 (FIG. 11), which inputs 118 are connected to the address register 120 and memory recovery circuit 121 through the switch 119.

The switching device 119 has a control circuit 122. The unit 22 also has an input data register 123 and an output data register 124 connected respectively to the input 125 and output 126 data switching devices. The input switching device 125 has a control circuit 127. The inputs 28 of the unit 22 are used for playback and recording of information in the memory device 127 which has another switch 128 for erasing the memory of the device 117.

The input data switching device 120 is designed for switching the following input signals: a signal of the least inner circle 93 (FIG. 8) of the simulated weldpool, a signal of the central point 129 of the weldpool ("weldpool center") and a signal of location of the electrode simulator 49 (FIG. 4).

The output data switching device 126 is designed for switching the output signal of the welding joint image generation unit 22 in the "recording"-"playback" operating mode and may be built around a well known circuit.

The circuit 127 for controlling the input data switching device (125) is a double selector switch for changeover the operating conditions of the trainer.

The data register 123 and output data register 124 are intended for temporary storage of the recorded and read data.

The address register 120 is designed for storage of the address of the memory cell, into which the data had been recorded or from which the data are to be read.

The memory recovery circuit 121 is used for recovery of the content of the memory cells of the device 117 during the line timing pulses.

The address switching device 119 is designed for connection of the address inputs of the device 117 either to the inputs of the address register 120 or to the outputs of the memory recovery circuit 121.

The circuit 122 is designed for controlling the address switching device 119 and consists of a trigger.

The device 117 is a dynamic working storage device, for example, based on four integrated circuits with organization 4×16,000 bits.

FIG. 12 shows the unit 30 shaping the path of motion of the weldpool image intended for shaping on the display 4 (FIG. 2) the paths of motion of the weldpool image corresponding to different types of welder's "handwriting" shown in FIG. 13a—"straight line" 130; FIG. 13b—"saw" 131; FIG. 13c—"meandre" 132; FIG. 13d—"trapezium" 133.

The unit 30 shaping the path of motion of the weldpool image (FIG. 12) is also used for controlling the weldpool speed in the horizontal and vertical directions, controlling the width and step of movement of the weldpool as well as for changing the direction of motion, starting and stopping the weldpool.

The unit 30 comprises a pulse generator 134 producing pulses corresponding to the speed of motion of the weldpool image in the horizontal direction which output is connected through a starting switch $135_1$ and $135_2$ to switching circuits 136 and 137 and a pulse generator 138 producing pulses corresponding to the speed of motion of the weldpool in the vertical direction which output is connected through a starting switch $135_3$ and $135_4$ to the switching circuits 139 and 140.

The unit 30 also has a pulse generator 141 producing pulses corresponding to the value of the step of motion of the weldpool image whose output is connected through a starting switch $135_5$ to the input 142 of a trigger 143 and to the input 144 of an inverter 145. The direct output of the trigger 143 is connected to the input 146 of an AND element 147, while the inverse output of the trigger 143 is connected to the input 148 of an AND element 149. The inputs 150 and 151 of the AND elements 147 and 149 are connected to the generator 141 through the switch $135_5$.

In addition, the unit 30 has a switch $152_1, 152_2, 152_3$ for changing the path of motion of the weldpool image. It is connected to the outputs of the generator 141 through the switch $135_5$, to the output of the inverter 145 and through the NOT elements 153 and 154 it is connected to the outputs of the AND elements 147 and 149 and to the control inputs 155 and 156 of the switching circuits 139, 140; through the switch 157 the unit 30 is connected to the control inputs 158 and 159 of the switching circuits 136 and 137.

The controlled generators 134, 138 and 141 are controlled square-wave oscillators whose frequency is controlled by means of potentiometers 160, 161 and 162.

The switching circuits 136, 137, 149 and 140 are intended for switching the output signals from the controlled generators 134 and 138.

The trigger 143 is designed for division of the frequency of the signal from the output of the controlled generator 141 by two.

A number of circuits shown in FIG. 14 are used for generating control signals required for moving the weldpool image following the movement of the end of the simulator 2 on the screen of the display 4.

The circuit for measuring the arc gap length 163 comprises a sensitive element 53 sensing the arc gap length connected to the input 7 of an amplifier 164, while the output of the amplifier 164 is connected to the input of an AND element 165 whose second input is connected to the output of a NOT element 166. The input of the NOT element 166 is an input 167 of the whole circuit 163. The output of the AND element 165 is connected to the input of a detector 168, while the output of the detector 168 is connected to the input 47 of the heat balance electronic model 1 (FIG. 2) and serves as an output of the circuit 163 (FIG. 14).

The circuit 169 for determining the location of the simulator 2 (FIG. 2) of the welding electrode with respect to the screen of the display 4 comprises a sensitive element 170 (FIG. 14) whose output is connected through an amplifier 171 to a comparator 172. The output of the comparator 172 is connected to one input of an AND element 173 which other input is the input 167. A NOT element 174 is connected at the output of the AND element 173.

The amplifiers 164 and 171 are designed for amplification of the signals received by the sensitive elements 53 and 171 (FIGS. 4 and 14) to a required level and may be built around a well known circuit of a wideband amplifier.

The elements 165, 166, 173 and 174 are intended for time-selective passage of the signals received by the sensitive element 53 (FIG. 4) and sensitive element 170 (FIG. 14) and for transmitting these signals to the inputs of the corresponding units for processing these signals.

The comparator 172 is designed for separation of a useful input signal from the sensitive element 170 from the entire spectrum of the input signals.

The detector 168 is designed for detecting the signals with a frequency 15,625 : 3 kHz reflected from the screen of the display 4 and received by the sensitive element 53 of the circuit for measuring the arc gap length 163. The time constant of the output circuit of the detector 168 is much higher than 3/15,625 ms and lower than the time constant of the welder's hand movement.

The circuit 175 for separation of error signals representing the deviation of the weldpool image comprises identical channels for processing the data along the horizontal and vertical axes. Each channel comprises the following components connected in series: a digital delay line 176 (177), a preprocessing circuit 178 (179), a circuit 180 (181) for determining the error value and controlling the weldpool image motion, and a digital-to-analog converter 182 (183).

A circuit consisting of an AND element 184 (185) and a NOT element 186 (187) is connected to one of the inputs of the circuit 180 (181).

The inputs of the AND elements 184 (185) are an input of 188 of the whole circuit 175, the inputs of the circuits 180 (181) and the inputs of the circuits 178 (179) are inputs 189, 190 and 191 of the circuit 175.

The output of the circuit 175 is connected to the input 192 (FIG. 2) of the unit 22 and to the input 193 of the unit 10, while the outputs of the circuit 180 (181) (FIG. 14) are connected to the inputs 194 (FIG. 2), 195, 196 and 197 of the timing unit 25.

The input 167 connected to the output of the timing unit 25 is combined with the inputs of the circuits 178, 179, 180, 181, while the outputs of the circuits 178, 179 are connected to the inputs of the AND elements 184, 185.

The delay lines 176 and 177 are intended for compensation of the delay appearing due to dynamic excitation of the phosphor of the display screen and also due to the delay in the propagation of the signal in the connecting, amplifying and forming circuits (170, 171, 172, 173, 174).

The signal preprocessing circuits 178 and 179 are designed for determining the time error between the reception of the signal on the location of the end of the simulator 2 of the welding electrode and the signal of the weldpool image center along the horizontal and vertical axes.

The digital-to-analog converters 182 and 183 are intended for conversion of the number of pulses supplied from the outputs of the circuits 180, 181 into analog signals of the speed of the end of the welding electrode simulator 2 (FIG. 2) along the horizontal and vertical axes.

The circuit 198 for determining the signal corresponding to the welding speed (FIG. 14) comprises connected in series a logarithmic amplifier 199 (200), an amplifier 201 (202) and an antilogarithmic amplifier 203 (204), the outputs of the amplifiers 201 and 203 being connected to the inputs of an adder 205. The output of the adder 205 is connected in series to logarithmic amplifier 206, amplifier 206 and antilogarithmic amplifier 208 which output is connected to the input 46 of the electronic model 1 (FIG. 2).

The inputs of the circuit 198 (FIG. 14) are connected to the outputs of the digital-to-analog converters 182 and 183.

The training control and monitoring unit 10 is made in accordance with the block diagram shown in FIG. 15. It comprises a pulse generator 209, an AND element 210, an audio-frequency oscillator 211 of alarm and noise background signals and a channel 212 for controlling the electrode fusion simulation drive.

The arc gap length measuring channel comprises a circuit 213 producing an error signal by the arc gap length, an adjustable pulse generator 214 and a circuit including a switching circuit 215, a counter 216, a decoder 217 and an integrator 218 connected in series. The input of the circuit 213 is an input 219 of the whole unit 10.

The channel for measuring the slope angle of the welding electrode simulator comprises a circuit 220 for generation of an error signal by the angle of slope of the welding electrode simulator, an adjustable generator 221 and a circuit including a switching circuit 222, a counter 223, a decoder 224 and an indicator 225 connected in series.

The channel for controlling the weldpool thermal conditions comprises a circuit 226 producing an error signal in response to the weldpool thermal conditions, an adjustable generator 227 and a circuit including a switching device 228, a counter 229, a decoder 230, and an indicator 231 connected in series.

The channel producing an error signal by tracking the weldpool image comprises a circuit 232 tracking the weldpool image and generating an error signal; the input of the circuit 232 is the input 233 of the unit 10, an adjustable generator 234 and a circuit including a switching circuit 235, a counter 236, a decoder 237 and an indicator 238 connected in series.

The channel determining the downtime comprises a comparator 239 responding to a break of the arc, a switching circuit 240, a counter 241, a decoder 242 and indicator 243 connected in series.

The channel for determining the working time comprises a switching circuit 244, a counter 245, a decoder 246 and an indicator 247 connected in series, said channel being connected to the output of the AND element 210.

The channel for determining the time of the welding seance includes a counter 248, a decoder 249 and an indicator 250.

The channel for measuring the sticking time of the welding electrode simulator includes a sticking time comparator 251 and a circuit comprising a switching circuit 252, a counter 253, a decoder 254 and indicator 255 connected in series.

The pulse generator 209 is connected through a starting switch 256₁ to the inputs of the switching circuits 240, 244, 252 and to the input of the counter 248. The generators 227, 214, 234, 221 are connected through switches 256₂, 256₃, 256₄ and 256₅ to the data inputs of the switching circuits 228, 215, 235, 222 respectively. The frequency of the generators 227, 214, 234, 221 is varied by potentiometers 257, 258, 259 and 260.

The outputs of the circuits 226, 213, 232, 220 are connected to the inputs of the AND element 210 and audio-frequency oscillator 211, while the output of this oscillator 211 is connected to the input 17 of the helmet 3 (FIG. 2). The output of the arc break comparator 239 (FIG. 15) is connected to the input of the channel 212 for controlling the electrode fusion simulation drive which second input is connected to the input 11 of the unit 10.

The counters 229, 216, 236, 223, 241, 245, 248, 253 are intended for calculation of the number of errors and time and may be built around a well known circuit of decade counters.

The audio-frequency oscillator producing alarm signals and noise background incorporates sine-wave audio-frequency oscillators tune to different audio frequencies.

The channel 212 for controlling the electrode fusion simulation drive is a power amplifier loaded by the windings of the drive electric motor.

The circuits 226, 213, 220 generating error signals are made in the form of comparators.

FIG. 16 shows an embodiment of the circuit 232 generating an error signal by tracking which includes an AND element 261 which output is connected to the first input 262 of the pulse counter 263. The direct and inverse outputs of the counter 263 are connected to the inputs 264, 265 of the AND element 266 which output is connected through an AND element 267 to the input of an AND element 268 connected to the output of the whole circuit 232.

The output of the AND element 268 is connected to the input 269 of the counter 263. The input of the AND element 261 is combined with the inputs of the circuit 232 through switches 270, 271, 272, 273 controlling the tracking sensitivity.

The signal preprocessing circuit 178 (179) (FIG. 17) comprises two D-triggers 274 and 275, an R-S trigger 276 and a comparison circuit 277. The input 278 of the circuit 178 is a data input of the trigger 274, the input 190 of the circuit 178 is a data input of the trigger 275 while the input 279 of the circuit 178 is a setting input of the triggers 274 and 275 whose outputs are connected in pairs to the inputs of the trigger 276 and comparison circuit 277 whose output is connected to the input 280 of the AND element 184. The outputs of the trigger 276 are connected to the inputs 281 and 282 of the circuit 180.

The circuit 180 (181) (FIG. 18) for determining the error value and controlling the weldpool image motion comprises a bidirectional counter 283, e.g. having a scaling factor of "256", four AND elements 287, an OR element 288 and NOT element 289. The inputs of the OR element 288 are connected digitwise to the output of the counter 283 whose substracting input is connected to the output of the element 286 while the summing input of the counter 283 is connected to the output of the element 287. The output 290 of the circuit 180 is an input of the element 286 whose second input is the input 189 of the circuit 180. The first and second inputs of the elements 284 and 285 are inputs 291 and 191 of the circuit 180, while the third inputs of the elements 284 and 285 are connected through an element 289 to the output of the element 288 whose output through the element 289 is also connected to the first input of the element 287 whose second and third inputs are the inputs 291 and 191 of the circuit 180. The fourth input of the element 284 is the input 281 and the fourth input of the element 285 is the input 282 of the circuit 180. The outputs of the elements 284 and 285 are data outputs of the circuit 180. The setting input of the counter 283 is an input 291 of the circuit 180.

The welder's trainer operates as follows. At first, let us consider the operation of individual units of the trainer.

The welding situation simulation process timing unit 25 operates as follows.

The main function of the timing unit 25 is to generate clock pulses synchronizing the operation of all units of the trainer, present the television raster in a discrete form, start the microraster and move it on the televison display screen. Applied to the first inputs of the comparison circuits 61 and 62 (FIG. 6) is the current address of the moving beam of the television scanning, while to the second inputs of the same circuits is fed the content of the counters 57 and 58 determining the horizontal and vertical position of the microraster. When all digits of the codes being compared coincide at all inputs of the comparison circuits the AND elements 67 and 68 operate and send commands for starting the microraster along the horizontal and vertical axes to the input 26 of the timing unit 25.

Thus the position of the microraster on the television raster is determined by the numbers stored in the microraster horizontal and vertical position counters 57 and 58. Therefore, in order to move the microraster on the screen, the control pulses must be applied to the subtracting or summing inputs of the microraster horizontal and vertical counters 57 and 58. When the operating mode selector switch 70 in the "Welding" position, the circuit 175 for separation of error signals controls the movement of the microraster along the screen depending on the position of the welding electrode simulator 2. In the "Tracking" operating mode the microraster is moved by the signals sent by the unit 30 shaping the path. The switching of the control signals from these two directions to the inputs of the microraster horizontal and vertical position counters 57, 58 is effected by the switching device 69 for controlling the microraster motion.

The weldpool image generation unit 18 is identical to the grooving image generation unit 19 and further we will discuss the operation of the unit 18 which is run as follows.

The signal for starting the raster along the horizontal axis supplied to the input 36 of the weldpool image generation unit 18 (FIG. 7) from the timing unit sets the raster starting trigger 83 moving the raster along the horizontal axis to the "one" state. The high potential at the direct output of the trigger 83 for starting the raster along the horizontal axis renders the AND element 79 conductive and 8-MHz pulses are sent through this AND element 79. In the same way, upon reception of a control signal for starting the raster along the vertical axis, the trigger 84 and the AND element 80 apply pulses with the line scanning frequency of the display 4 (FIG. 2) to the clock input of the raster vertical sampling counter 75. After each cycle of operation of the counters 74 and 75 (FIG. 7) has been completed, the triggers 83 and 84 are reset to their initial state. This process is repeated in each television frame. The outputs of the horizontal and vertical raster sampling counters 74 and 75 are connected to the input of the weldpool image generation unit 78, which is a combinational circuit or may be based on constant memory devices intended for generation of images of four concentric circles 93–96 (FIG. 8) modeling the weldpool. As shown in FIG. 8, the circles 93–96 on the screen 92 of the display 4 are approximated by stepped lines, the accuracy of this approximation being defined mainly by the frequency of the sampling along the horizontal and vertical axes.

For increasing the quality of simulation of a real welding process, the trainer is provided with a welding process sparking image generation unit 20 (FIG. 10). This unit generates an image of sparks occasionally flying from the center of the weldpool. The radius of the flying sparks is determined by the microraster size.

The welding process sparking image generation unit 20 operates as follows.

Since the counting module of the spark position counter 98 (FIG. 9) is equal to 16, the spark image is lighted up on the screen (92) of the display 4 discretewise sixteen times in the process of its movement along the corresponding path. The choice of one of twelve possible paths of flight of the spark is effected by means of the pseudo-random pulse train generator 100.

The sparking path former 97 forms possible paths of flight of the sparks in the microraster. When the higher-order digits of the raster horizontal and vertical sampling counters 74 and 75 are connected to the first inputs of the sparking path former 97 and the second inputs of the former 97 are connected to the spark position counter 98, it is possible to generate the signals of the horizontal and vertical bands moving from the microraster axes to its boundaries. The movable elements 107 simulating the sparks (FIG. 10) move along the horizontal, vertical and diagonal paths.

FIG. 10 shows a microraster illustrating all twelve possible sparking paths 104. The hatch lines 105 in the top left-hand quadrant of the microraster illustrate the moving bands, while the pointers 106 show the direction of their movement.

The switch 111 (FIG. 9) controls the image of the sparks, i.e. their appearance on the screen 92 (FIG. 8) of the display 4 in the "Welding" operation mode. The output signal of the sparking path former 97 (FIG. 9) is transmitted through the switch 111 to one of the inputs of the video mixer 108, the other inputs of which receive the video signals of the weldpool image (circles 93–96), video signals of grooving and welding joint image, as well as the line and frame timing pulses. The video mixer 108 is a device producing a composite video signal simulating on the display screen a visual situation typical for a real welding process. From the output of the unit 20 the composite video signal is applied to the input 8 of the display 4. The amplifier 110 controls the amplitude of the luminance video signal of the weldpool proportional to the voltage corresponding the weldpool temperature. The control voltage is fed from the heat balance electronic model 1 (FIG. 2) to the input 6 of the unit 20 and, having passed through the electronic switch 109 (FIG. 9) in the "welding" mode, is applied to the input of the amplifier 110. The higher the level of the control voltage, the higher the level of the luminance signal at the output of the amplifier 110 and this corresponds to the weldpool heating in a real welding process and to an increase in the luminance of the image on the screen 92 of the display 4. In the "tracking" operating mode of the trainer the electronic switch 109 does not send the control voltage to the amplifier 110 and the input of the latter receives from the switch 113 only a signal corresponding to the least diameter of the weldpool image (93) having a constant amplitude at the output of the amplifier 110. A specific feature of the amplifier 110 is the presence of a resistive matrix at its data inputs. The magnitude of the resistors of this matrix is selected so that the brightness of the image of the circles 93–96 (FIG. 9) on the screen 92 of the display 4 decreases with an increase of their numeral.

The counter 114 and AND element 115 pass the pulses with frequency F/3 during the frame timing pulse to the emitting elements 52. During the main trace of the television scan no pulses are applied to the emitting elements 52 and this increases the sensitivity of the sensitive element 170 (FIG. 14) of the circuit 169 for determining the location of the simulator 2 (FIG. 14).

The welding joint image generation unit 22 operate as follows. The unit 22 stores the path of motion of the end of the welding electrode simulator 2 during a single seance of operation of the trainer and displays this path on the screen 92 for analysis of the quality of the conducted simulated welding process. Applied to the inputs 23, 192 (FIG. 11) of the unit 22 are three types of inputs signals determining the inner circle 93 of the simulated weldpool, a signal of the central point 129 of the weldpool and a signal from the circuit 175 for separation of error signals. Depending on the selected operating conditions of the welding joint image generation unit 22, one of these signals is stored in the input data register 123 with the help of the input data switching device (125) and the control circuit 127.

In the trainer the television raster is sampled in such a way that each its line is represented in the memory device 117 with "256" bits of information, the information at the inputs 23, 192 and at the output 24 of the welding joint image generation unit 22 is presented in succession, point after point and is produced at a frequency of 4 MHz. The recording and play back of the information in the memory device is effected at a frequency four times as low. The successive input information is converted into a 4-digit parallel code in the welding joint image generation unit 22 and then is recorded and read in such a form in the memory device 117; the four-digit words read from the memory device 117 are converted at the output 24 into a sequential form of data presentation. These operations are carried out by means of an input register 123, an output data register 124 and output data switching device 126 provided in the unit 22.

The recovery of the information stored in the memory device 117, which is a dynamic memory unit is effected during the back swing of the television raster scan, i.e. when there is no information exchange between the unit 22 and the other units of the trainer. The memory recovery circuit 121 produces a 7-digit code, which during the back swing of the television raster scan is fed to the address inputs of the memory device 117 through the address switching device 119.

Each memory cell of the memory device 117 corresponds to a definite point of the display screen; the address of this cell is formed in the timing unit 25 simultaneously with the movement of the electron beam of the television scan on the screen, and fourteen higher-order digits of said address are applied to the inputs 28 of the unit 22 or, more precisely, into the address register 120 of this unit 22. During one cycle of operation of the memory device 117 this address is transmitted in two steps (7 digits in each step) to the address inputs of the memory device 117 through the address register 120. This address is used for writing the information into the memory device 117 or read therefrom.

The input data switching device (125) is controlled by control signals "A" and "B" from the control circuit 127 controlling the input data switching device (125). With A=0 and B=0, the signal of the central point 129 (FIG. 8) of the weldpool is sent to the data input of the input data register 123 (FIG. 11); with A=0, B=1 this input is fed with the signal of the circle 93, and in the case of combinations AB=10 and AB=11 this input receives the signal from the circuit 175 (FIG. 11).

In the welding joint image generation unit 22 the information is recorded or played back every other frame following the control signals applied to the inputs 28' of the unit 22.

The unit 30 shaping the path of motion of the weldpool images operates as follows.

The unit 30 shaping the path of motion of the weldpool image (FIG. 12) presents on the display screen possible paths of motion of the weldpool image corresponding to the various types of the welder's "handwriting" shown in FIG. 13 of this application.

Figure 6:
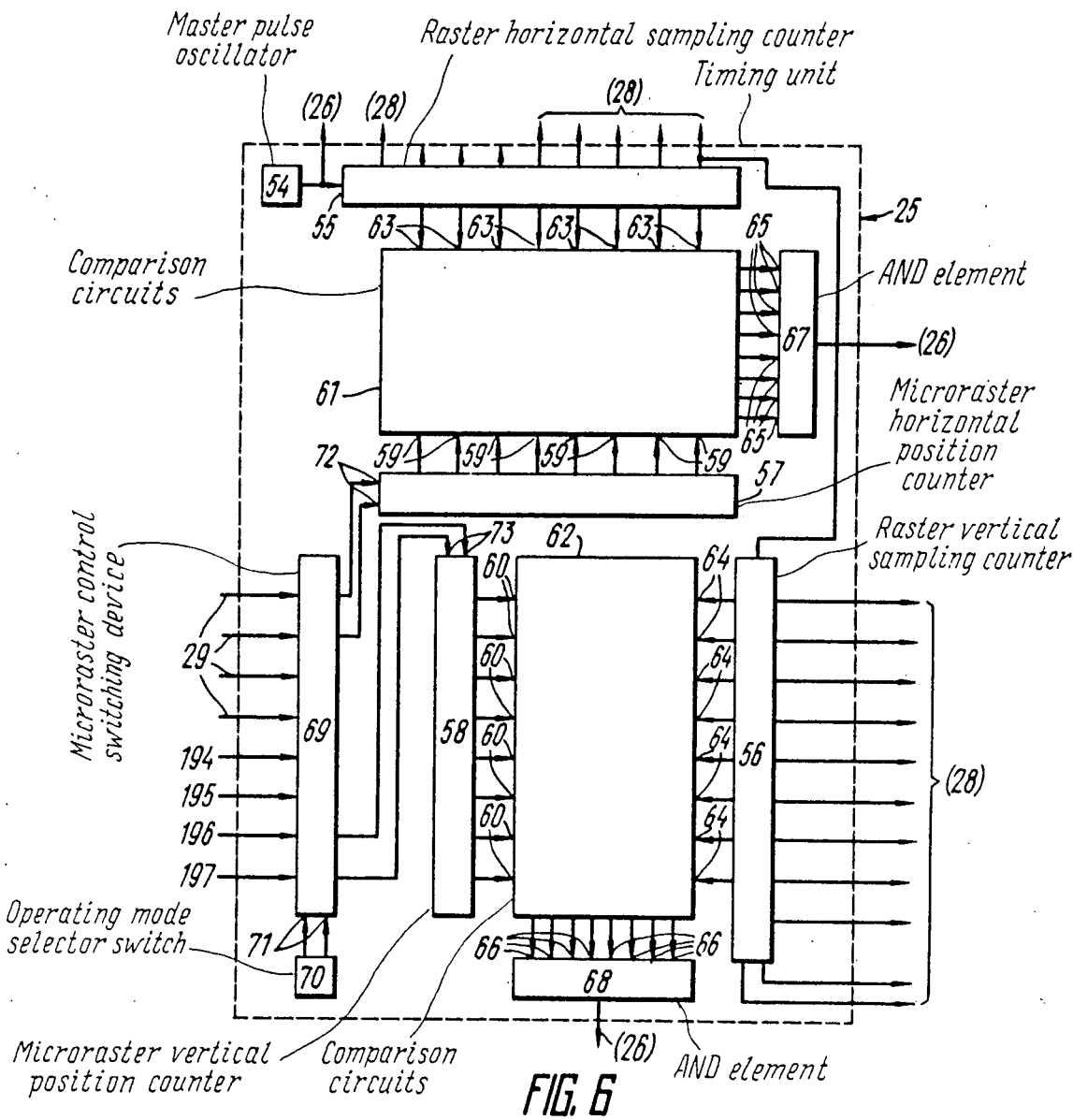
FIG. 6 is a block diagram of the welding situation simulation process timing unit according to the invention.

The position of the weldpool image on the display screen is determined by the state of microraster horizontal and vertical position counter 57 and 58 (FIG. 6) of the timing unit 25. By changing the state of these counters 57, 58, more precisely, by applying pulses to their summing or subtracting inputs, we can move the weldpool image on the plane of the screen 92 of the display 4 (FIG. 8). The speed of the weldpool image is determined by the repetition frequency of the pulses applied to the inputs of the microraster horizontal and vertical position counter 57 and 58 (FIG. 6). Thus, by properly combining the supply of the control pulses to the inputs of these counters, one can move the weldpool image on the display screen by a necessary law (FIG. 13). The speed of motion of the weldpool image along the horizontal axis is determined by the frequency of the generator 134, while the speed of motion along the vertical axis is determined by the frequency of the generator 138. The frequency control of these generators 234, 138 is effected by means of potentiometers 160 and 161. By varying the frequency of the generator 141 with the help of the potentiometer 162, one can control the width and step of motion of the weldpool image.

Let us consider the operation of the unit 30 shaping the path of motion of the weldpool image, said path being a straight line. The switch 135 is closed, the switch 157 is in position $157_1$ while the switch 152 is in position $152_1$. In such a position of the switches the switching circuit 136 is rendered conductive due to the presence of a low potential at its control input. The switching circuits 137, 139, 140 are rendered nonconductive due to the presence of a high potential at their control inputs. Thus the control pulses are fed to the input 29 of the unit 30 shaping the path of motion of the weldpool image, and this makes it possible to move the weldpool image along a straight horizontal line.

Now let us consider the operation of the unit 30 shaping the path of motion of the weldpool image along a sawtooth line (FIG. 13b). The switches 135 and 157 are in the same position while the switch 152 is in position $152_2$. As before, the switching circuit 136 is rendered conductive, and the input $29_1$ is continuously receiving the control signals causing movement of the weldpool image along the horizontal axis. The control inputs of the switching circuits 139 and 140 are fed with signals from the generator 141, which alternately render conductive and switching circuits 139 and 140 so that at the outputs $29_3$ and $29_4$ we have alternating control signals from the output of the pulse generator (138) for moving the weldpool image along the vertical axis. The control signals at the outputs $29_3$ and $29_4$ of the unit 30 shaping the path of motion of the weldpool image will move this image up and down thus providing its sawtooth motion on the screen 93 of the display 4. For normal operation of the unit 30 shaping the path of motion of the weldpool image the generation frequency of the generator 141 must be much lower than that of the generators 134 and 138.

The "meandre" and "trapezium" type paths of motion of the weldpool image on the display screen are formed in a similar way (FIGS. 13c and 13d).

The circuits 163, 169, 175, 198 shown in FIG. 14 operate as follows.

The circuit 163 is used for measuring the current length of the arc gap. During the passage of the frame timing pulse the sensitive element 53 receives the optical signals with a frequency F/3 reflected from the display screen and transforms them into electric signals. These signals amplified in amplitude by the amplifier and fed through the AND element 165 during the frame timing pulse to the input of the detector 168. The value of the d-c voltage at the detector 168 output determines the length of the arc gap. As the arc gap length is reduced, the output voltage the detector 168 rises up and vice versa.

The circuits 169 and 175 are the main link in the system of automatic control of the motion of the weldpool image on the display screen under the "Welding" operating conditions of the trainer. When the sensitive element 170 equipped with a focusing system for separation of a single line of the television raster approaches the plane of the screen 92 of the display 4, the sensitive element 170 receives an optical signal corresponding to the time needed for movement of the light spot from the screen 92 to the field of vision of the sensitive element 170. This signal transformed into an electric signal is amplified by the amplifier 171 and applied to the input of the comparator 172, which produces a useful signal on a noisy background. The positive pulse from the output of the comparator 172 is fed through the elements 173 and 174 during the forward run of the line scan to the inputs of the digital delay lines 176, 177 of the horizontal and vertical channels as well as through the delay line 176 of the horizontal channel to the output 192 of the circuit 175. The pulse generated by the comparator 172 is delayed with respect to the instant of appearance of the electron beam on the CRT display under the optical axis of the sensitive element 170. The delay is caused by the dynamic property of the phosphor of the screen 92 as well by the delay in the propagation of the received signal in connecting, amplifying and shaping circuits. The delay lines 176 and 177 of the horizontal and vertical channels provide a delay of the input signal by the time, which together with the natural delay time is equal approximately to the duration of a single television line. Thus, the pulses appearing at the outputs of the delay lines 176 and 177 of the horizontal and vertical channels coincide in time with the passage of the electron beam of the cathode-ray tube under the axis of the sensitive element 170 in the next line, and this insignificant, because the circuit 175 provides separate processing of the signals fed through said channels.

The output signal of the digital delay line 176 of the horizontal channel is applied to the input 278 of the signal preprocessing cicuit 178 or, more precisely, to the data input of the trigger 274 (FIG. 17). The video signal of the center of the weldpool image along the horizontal axis is applied to the data input of the trigger 275 of the signal preprocessing circuit 178. The circuit 178 determines the error time between the instant of appearance of the signal from the delay line 176 and the instant of appearance of the signal of the weldpool image center on the horizontal. Such an error signal is produced at the output 280 of the comparison circuit 277 of the preprocessing circuit 178 whose inputs are connected to the outputs of the triggers 274 and 275 of this circuit. The outputs of the triggers 274 and 275 are also connected to the inputs of the trigger 276 of the preprocessing circuit 178; at the outputs 281 and 282 of the trigger 276 there is generated a signal determining the error sign. Thus the difference in time between the reception of the signal from the delay line 176 and reception of the signal of the weldpool image center along the horizontal (their sequence is registered by the trigger 276) defines the error sign. The triggers 274 and 275 are reset by the frame timing pulse.

The signal from the output 280 of the preprocessing circuit 178 passes through the elements 184 and 186 to the input 290 of the circuit 180 (181) (FIG. 18) for determining the error value and controlling the weldpool image motion along the horizontal axis only in the presence of a control signal from the arc break comparator 239, which finds out whether the total length of the arc gap is in preset limits. The input signal from the input 290 permits passage of the 4-MHz pulses from the input 189 of the circuit 180 (FIG. 18) for determining the error value and controlling the weldpool image motion through the AND element 286 to the substracting input of the counter 283 of this circuit 180. The higher the error between the time of arrival of the signal from the digital delay line 176 and the signal of the weldpool image center, the greater amount of pulses with a frequency of 4 MHz will be fed to the substracting input of the counter 283. During the frame timing pulse from the input 191 of the circuit 180 for determining the error value and for controlling the weldpool image motion the frame timing pulses are sent through the AND element 287 to the summing input of the counter 283 as well to the second inputs of the AND elements 284 and 285. Depending on the error sign, these pulses are sent through the AND element 284 and 285 to the output 194 or 195 of the circuit 180 for determining the error value and for controlling the weldpool image motion. These control pulses are applied to the summing or substracting input of the microraster horizontal position counter 57 of the welding situation simulation process timing unit 25. On reaching the zero state in all places of the counter 283, the elements 288 and 289 produce a control signal inhibiting the passage of the line timing pulses to the summing input of the counter 283 and to the outputs 194 or 195 of the circuit 180 for determining the error value and for controlling the weldpool image motion. If during the frame timing pulse the counter 283 does not come to the zero state, this is effected by the rear edge of the vertical sync pulse. In the next frame the process is repeated in the same sequence.

If there is no error between the instant of reception of the signal from the delay line 176 and the signal of the weldpool image center, control pulses are not applied to the outputs 194 and 195. Using the vertical sync pulses with adequately low frequency as control pulses we can simulate the inertia of the weldpool when moving its image on the display screen at a limited speed, and this makes the simulated welding condition close to the real conditions of the welding practice.

The signal preprocessing circuit 179 and the circuit 181 for determining the error value and for controlling the weldpool image motion along the vertical axis are identical to the respective circuits 178 and 180 of the horizontal signal processing channel and operate in the same manner.

The output pulses from the circuits 180 and 181 for determining the error value and for controlling the weldpool image motion along the horizontal and vertical axes are supplied to the inputs of the digital-to-analog converters 182 and 183, which convert the numerical value of the pulses fed to the inputs 194-197 of the circuit 175 into analog signals of the speed of motion of the welding electrode simulator end with respect to the weldpool image center. It will be noted that the longer distance is passed by the end of the simulator 2 (sensitive element 170) per frame from the weldpool image center, the higher amount of pulses come to the outputs 194-197 of the circuit 175 for moving the weldpool image under the center of the sensitive element 170. This, the number of pulses at the outputs 194-197 is a numerical expression of the speed of the end of the simulator 2 along the horizontal and vertical axes. The circuit 198 calculated the analog voltage whose value is proportional to the welding speed and which through the output 46 of the circuit 198 is fed to the heat balance electronic model 1.

Thus the circuit 175 for separation of error signals determines the error between the instant of reception of the signal from the delay lines 176 and 177 and the instant of reception of the signal of the weldpool image center and generates signals controlling the motion of the weldpool image over the display screen so as to make this error as small as possible. In other words, the weldpool image moves on the screen tending to be under the center of the sensitive element 170.

The training control and monitoring unit 10 operates as follows.

First, we will consider the operation of the circuit 232 generating an error signal by tracking.

In the initial state of the counter 263 (FIG. 16) a binary number "10" is recorded. In this case a code "11" is present at the inputs of the AND element 266. The logical zero at the output of the NOT element 267 inhibits the passage of vertical sync pulses from the input 233 of the circuit 232 generating an error signal by tracking through the AHD element 268 to the input 269 of the counter 263. This state is stable. If during any frame period the signal from the delay line 176 (FIG. 14) coincides in time with the video signal of the weldpool image, a control pulse is generated at the AND circuit 261 (FIG. 16). This control signal sets the counter 263 to the "00" state. A logical unity signal is produced at the output of the AND element 267, which permits the passage of the vertical sync signals to the input 269 of the counter 263 and switches off the circuit 235 of the control and monitoring unit 10. The vertical sync pulse at the end of the given frame sets the counter 263 to the "01" state ("00" at the inputs of the AND element 266). If during the next frame period the signal from the digital delay line 176 (FIG. 14) coincides with the signal of the weldpool image, the counter 263 (FIG. 16) is reset to the "00" state and the process is repeated.

This process goes on until there is no coincidence in any frame. In this case the vertical sync signal following this frame will drive the counter 263 from the "01" state to the "10" state, which is the initial state of the circuit 232 generating an error signal by tracking. Having been reset to the initial state, the circuit 232 is ready for sending a regular coincidence signal. If the signal from the digital delay line 176 (FIG. 14) does not coincide in time with the video signal of the weldpool image (tracking error) at the output of the AND element 267 (FIG. 16) does not render conductive the switching circuit 235 of the control and monitoring unit 10, and the pulses from the output of the adjustable generator 234 (FIG. 15) are applied to the input of the counter 236 counting the number of tracking errors provided in the control and monitoring unit 10.

Since the weldpool image is generated by means of four circles 93-96 (FIG. 8) of a different diameter, the switches 270-273 (FIG. 16) can be used for controlling the sensitivity of tracking for welders of different skills.

The other units and elements of the control and monitoring unit 10 operate as follows.

On pressing the "Start" button 256 (FIG. 15), the second pulses from the output of the pulse generator 109 are fed to the welding seance counter 248, which registers the complete time of the simulated welding process. The same second pulses are supplied through a switching circuit 240 to a downtime counter if the welder does not excite the simulated arc. The instant of arc origination is recorded by an arc break comparator 239, which produces a respective signal applied to the control input of the switching circuit 240. If during the arc origination the welder did not maintain the minimum permissible length of the arc gap, which corresponds to sticking of the electrode under real welding conditions, the comparator of electrode simulator sticking comparator 251 operates and its output signal breaks the passage of the second pulses through the switching circuit 252 to the input of the counter 253 registering the time of welding-up of the welding electrode simulator.

If the process of arc origination was correct and the welder maintains the basic checked parameters of the simulated welding process in the limits preset in the error signal generation circuits 226, 213, 220, 232, the signal at the output of the AND element 219 will permit passage of the second pulses through a switching circuit 244 to the input of the working time recording counter 246. The working time is the time during which none of the checked parameters of the simulated welding process overcomes its preset limits. The audio-frequency oscillator 211 of alarm and noise background signals produces a noise-like audio signal of a normal welding process, which is fed to the output 17 of the control and monitoring unit 10. The channel 212 for controlling the electrode fusion simulation drive will start the motor moving the electrode simulator (the motor is not shown in the drawings); the speed of this motion is controlled by the signal applied to the input 11 of the control and monitoring unit 10.

If one or several monitored parameters of the welding process being simulated are not maintained within permissible limits, this results in operation of circuits producing error signals by a corresponding parameter being monitored. The output signals of these circuits will allow transmission of alarm audio signals to the output 17 of the control and monitoring unit 10 from the output of the audio-frequency oscillator 211 of alarm and noise background signals and also allow the passage of the output pulses from the adjustable generators 227, 214, 234, 221 through switching circuits 228, 216, 235, 222 to the inputs of the counters 229 counting the number of errors in the thermal conditions of the weldpool, arc gap length counter 216, a tracking counter 236, and a welding electrode slope angle counter 223. The frequency of recording the errors by the monitored parameters is controlled by means of potentiometers 257-260.

The welder's trainer as a whole operates as follows.

Depending on the preparation and skill of the welder to be taught, the trainer is used in two basic operating modes: a program mode ("Tracking") and self-training ("Welding"), the program operating mode being preferable in course of initial training of the welders. In this mode the trained welder's task is to track with the end of the welding electrode simulator the weldpool image with its continuous motion when preparing the simulated surfaces to be welded along a strictly specified path with simultaneous simulation of the electrode burnout. In the case of conduction of an abnormal welding process the welder receives error signals from the sensors of the main monitored parameters of the welding process (feedback signals) or visually noticed disagreement between the seam path made by the welder and the reference one. The monitoring, recording of the results and organization of feedback signals to the welder is effected by one or several parameters simultaneously. As the welder acquires required psychomotor habits and masters correct conduction of the welding process, the range of permissible limits of deviation of the monitored parameters may be reduced or when estimating the skill of an experienced welder for performing specific job, it is possible to determine extactly the degree of mastering every of the basic welding techniques.

In the self-training mode the welder conducts the simulated welding process independently, the weldpool image tracks the position of the end of the welding electrode simulator with simultaneous simulation of burnout of the electrodes and display of the path of motion of its end along the edges of the welded surfaces being simulated. The welders hears the audio feedback signal indication of the correspondence of the preset monitored parameters of the simulated welding process to the current parameters determined with the help of a system of sensors.

Both in the program and self-training mode before starting the simulated welding process the instructor (sometimes the welder himself) sets a required training mode using the corresponding controls and switches, selects the controlled parameters to be monitored from the total set of monitored parameters, sets the sensitivity and limits of the parameters to be monitored of the simulated welding process in accordance with the selected welding mode. Then the instructor gives instructions to the welder being trained on the selected mode of the welding process and on the required parameters of this process: arc gap length, slope angle of the welding electrode simulator, tracking, thermal conditions of the simulated welding process, light and audio accompaniment of the normal and abnormal process of welding. Having given the instructions and checking the quality of assimilation of the presented information, the instructor may conduct a trial sequence of welding in the trainer or commit this trial operation to the welder being trained.

For this purpose, the welder puts on the helmet with built-in headphones, takes the welding electrode simulator and starts the simulated welding process by an instructor's command or independently. By pressing the "Start" button, which is usually located on the welding electrode simulator holder, the welder moves the electrode simulator to the screen 92 of the display 4 which, in accordance to the job to be made, may be located in a vertical position, horizontal position, overhead, etc. After pressing the button the following parameters are started to be counted up: welding sequence time, working and "penalty" time, a number of errors by the parameters to be monitored of the simulated welding process in the control and monitoring unit 10. On the display screen an edge preparation image is shown which is generated in the edge preparation image generation unit 19. The welder being trained moves the end of the electrode simulator to the point of starting the welding, touches the screen at this point with the electrode simulator and quickly removes it from the display screen for a distance of a needed arc gap.

If the time of contact was short and the angle at which the contact was made is correct an optical weldpool appears on the screen (in the "Welding" operating mode while in the "Tracking" mode a circle image 93 is generated). The weldpool image gradually increases and its brightness changes following a change in the thermal conditions of the weldpool; the electrode starts shortening, an image of flying sparks appears around the weldpool image while in the headphones appears a noise corresponding to the normal arcing.

The welder should conduct the simulated welding process by making proper movements with the end of the welding electrode simulator between the surfaces being welded along the edges or along the joint lines. The optical weldpool will move along the grooving ("Welding" mode) leaving an image of the path of its motion on the screen in the form of a simulated welding joint whose image is generated in the welding joint image generation unit 22.

This process is effected continuously until the welder being trained maintains the parameters of the simulated welding process within the preset limits. If one or several preset parameters are disturbed, the welder being trained conducts an abnormal simulated welding process. In this case the brightness and size of the optical weldpool are changed (thermal conditions are disturbed), the weldpool image may disappear if the arc is broken, and audio alarm signals are heard in the headphones indicating a specific parameter of the simulated welding process which is not within the preset limits.

If a short circuit between the end of the welding electrode simulator and the display screen occurs (electrode sticking), the time counter 253 of the control and monitoring unit 10 is switched on for counting up the time of sticking of the welding electrode simulator, while in the case of the arc break the simulation of the electrode burnout is stopped. All these disturbance of the normal welding conditions are recorded in the control and monitoring unit 10 and are indicated by means of the corresponding indicators located on the front panel of the trainer. The quality of the welding job performed is estimated by the indications of these instruments after the end of the simulated welding sequence and by the image of the welding joint. As soon as the welder being trained assimilated the basic psychomotor habits of welding, the sensitivity by individual parameters of the simulated welding process may be increased and the preset parameters to be monitored may be changed as well as the position of the display screen in space.

The hardware of the claimed welder's trainer without any modification allow one to carry out an additional training of welders in the "Erasing" operating mode, which significally widens the functional possibility of the claimed trainer. This mode consists in that initially a required welding joint is formed on the display screen (by thin or thick line equal to the diameter of the circle 93) with the help of the unit 30 shaping the path of motion of the weldpool image and the welding joint image generation unit 22. The welding joint is formed along a strictly definite path without participation of the welder being trained. The subsequent task of the welder being trained is to repeat the whole path of the recorded welding joint during a strictly definite time period with the help of the welding electrode simulator. In this case the signals from the delay line 176 are fed into the unit 30 shaping the path of motion of the weldpool image and erase the initially recorded image. If the welder drives the end of the welding electrode simulator along the same path, he will completely erase all information having been recorded in the unit 30 shaping the path of motion of the weldpool image, and the weldpool image will disappear from the display screen. On the other hand, if the welder admitted errors or did not make his job within the preset time, the image partially remains on the display screen, namely at those places, where errors or incorrections were admitted. These may be used for estimating the welder's skill.

The claimed trainer makes it possible to improve the training efficiency and widen the functional possibilities of the technical means of welder's training due to the fact that the teaching process approaches the conditions of a real welding process. In addition, the training time is reduced.

What is claimed is:

1. A welder's trainer comprising:
    a welding situation simulation unit having an input and made in the form of a TV-type display having a screen:
    a welding electrode simulator having an input and an output;
    a welding process heat balance electronic model having an input and an output;
    a welding situation visual synthesis electronic model having inputs and a first and second outputs;
    said first output of said visual synthesis electronic model connected to said display;
    a training control and monitoring unit having first, second and third inputs and a first output, said first output connected to said input of said welding electrode simulator, a second output connected to said input of said heat balance electronic model and a third output connected to said input of said visual synthesis electronic model, said first input connected to the output of the welding electrode simulator, said second input connected to the output of the heat balance electronic model and said third input connected to the second output of the visual synthesis electronic model, in which said welding situation simulation unit is connected to said visual synthesis electronic model that provides an electronic model for visual synthesis of the welding situation on the display screen that is part of said welding situation simulation unit;

the welding situation simulation unit is connected to the trainer monitoring and control unit through the visual synthesis electronic model.

2. A welder's trainer as claimed in claim 1, in which said electronic model of visual synthesis of the welding situation comprises:
- a unit for generation of a weldpool image having inputs and an output connected to said input of said control and monitoring unit;
- a unit for generation of a grooving image having an input and an output;
- a unit for generation of a welding process sparking image having an input connected to said output of said weldpool image generation unit and to said output of said heat balance electronic model and an output connected to said welding electrode simulator input and to the display;
- a welding joint image generation unit having an input connected to said output of said weldpool image generation unit and an output connected to said input of said welding process sparking image generation unit.

3. A welder's trainer as claimed in claim 2, in which said visual synthesis electronic model comprises a welding situation simulation process timing unit having an input and an output connected to said input of said weldpool image generation unit, to said input of said welding joint image generation unit and to said welding process sparking process image generation unit.

4. A welder's trainer as claimed in claim 3, in which said welding joint image generation unit comprises; an address register having an output; an input data switching device, and a memory device having inputs connected to said output of said address register and to said input data switching device and having an output connected to said output data switching device.

5. A welder's trainer as claimed in claim 3, in which said welding situation visual synthesis electronic model comprises a unit shaping the path of motion of the weldpool image having an input connected to said input of said welding situation simulation process timing unit.

6. A welder's trainer as claimed in claim 5, in which said unit shaping the path of motion of the weldpool image comprises:
- a starting switch;
- a first pulse generator producing pulses corresponding to the speed of motion of the weldpool image along the horizontal axis having an output;
- a first switching circuit having a control input and an output;
- a second switching circuit having a control input and an output; said input of the first switching circuit and said input of said second switching circuit connected through said starting switch to said output of said first pulse generator;
- a second pulse generator producing pulses corresponding to the speed of motion of the weldpool image along the vertical axis having an output;
- a third switching circuit having an input, a control input and an output;
- a fourth switching circuit having an input, a control input and an output; said input of said third switching circuit and said input of said fourth switching circuit connected through said starting switch to said output of said second pulse generator;
- a third pulse generator producing pulses corresponding to the value of the step of motion of the weldpool image having an output;
- a first trigger having a direct output, an inverse output and an input connected through said starting switch to said output of said third pulse generator;
- an inverter having an output and an input connected through said starting switch to said output of said third pulse generator;
- a seventh AND element having a first input connected to said direct output of said first trigger, a second input connected through said starting switch to said output of said third pulse generator and having an output;
- an eighth AND element having an output, a first input connected to said inverse output of said first trigger, a second input connected through said starting switch to said output of said third pulse generator;
- a switch of weldpool image path connected to said output of said third pulse generator, to said output of said inverter and to said output of said seventh and eight AND elements;
- a third NOT element having an input connected to said weldpool image path switch and having an output connected to said control inputs of said third and said fourth circuits; a weldpool image direction changeover switch connected to said weldpool image path switch and to said control inputs of said first and said second switching circuits.

7. A welder's trainer as claimed in claim 2, in which said weldpool image generating unit comprises:
- a weldpool image former having an input and an output;
- a weldpool image center former having an input and an output;
- a counter of horizontal sampling of the weldpool image raster having an input, a group of outputs and an individual output connected to said input of said weldpool image generating unit;
- a counter of vertical sampling of the weldpool image raster having an input, a group of outputs and an individual output connected to said input of said weldpool image generation unit; a first AND element having a first input, a second input and an output connected to said input of said raster horizontal sampling counter;
- a second AND element having a first input, a second input and an output connected to said input of said raster vertical sampling counter;
- first trigger for starting the weldpool image raster having a first input, a second input and an output connected to said first input of said first AND element; said first input of said first trigger connected to said output of said raster horizontal sampling counter;
- a first trigger for starting the weldpool image raster having a first input, a second input and an output connected to said first input of said second AND element; said first input of said first trigger connected to said output of said raster vertical sampling counter;
- said second input of said first AND element, said second input of said second AND element, said second input of said first trigger and said second input of said second trigger are inputs of said weldpool image generation unit; said output of said weldpool image generation unit and said group of outputs of said raster horizontal sampling counter and said raster vertical sampling counter are outputs of the whole said weldpool image generation unit.

8. A welder's trainer are claim 2, in which the grooving image generation unit comprises:
  a grooving image former having an input and an output;
  a grooving image horizontal raster sampling counter having an input, a group of outputs and an individual output connected to said input of said grooving image generation unit;
  a grooving image vertical raster sampling counter having an input, a group of outputs and an individual output connected to said input of said grooving image generation unit;
  a third AND element having a first input, a second input and an output connected to said input of said grooving image horizontal raster sampling counter;
  a fourth AND element having a first input, a second input and an output connected to said input of said a grooving image vertical raster sampling counter;
  a first trigger for starting the grooving image raster having a first input, a second input and an output connected to said first input of said third AND element; said first input of the first trigger for starting the grooving image raster connected to said output of said grooving image horizontal raster sampling counter;
  a second trigger for starting the grooving image raster having a first input, a second input and an output connected to said first input of said fourth AND element; said first input of the first trigger for starting the grooving image raster connected to said output of said grooving image vertical raster sampling counter;
  said second input of said third AND element, said second input of said fourth AND element, said second input of said first trigger for starting the grooving image raster and second input of said second trigger for starting the grooving image raster are inputs of said grooving image generation unit; said output of said grooving image former and said group of outputs of said horizontal raster sampling counter and said raster vertical sampling counter are outputs of the whole grooving image generation unit.

9. A welder's trainer as claimed in claim 2, in which said welding process sparking image generation unit comprises
  a sparking path former having inputs and an output;
  a spark position counter having an input connected to said inputs of said sparking path former;
  a pseudo-random pulse train generator having an input connected to said input of said spark position counter and an output connected to said input of said former.

10. A welder's trainer as claimed in claim 2, in which said welding situation simulation process timing unit comprises: a master pulse oscillator having an output; a raster horizontal sampling counter having an input connected to said output of said master pulse oscillator and having an output; a raster vertical sampling counter having in input connected to said output of said raster horizontal sampling counter.

11. A welder's trainer as claimed in claim 10, in which said welding situation simulation process timing unit comprises:
  a microraster horizontal position counter having an input and an output;
  a microraster vertical position counter having an input and an output;
  a first comparison circuit having a first input connected digitwise to output of said microraster horizontal position counter, a second input connected digitwise to said output of said raster horizontal sampling counter, and having an output;
  a second comparison circuit having a first input connected digitwise to said output of said microraster vertical position, a second input connected digitwise to said output of said raster vertical sampling counter and having an output;
  a fifth AND element having inputs connected digitwise to said output of said first comparison circuit and having an output;
  a sixth AND element having an input and outputs connected digitwise to said output of said second comparison circuit:
  a switching device controlling the microraster motion comprising an operating mode selector switch and having outputs connected in pairs to said inputs of said microraster horizontal position counter and said microraster vertical position counter;
  said output of said fifth AND element and said output of said sixth AND element are data outputs of said welding situation simulation process timing unit.

12. A welder's trainer as claimed in claim 1, in which said visual synthesis electronic model comprises a circuit for separation of an error signal when said welding electrode simulator deviates from the center of the weldpool image on said screen of said display connected to said training control and monitoring unit.

13. A welder's trainer as claimed in claim 12, in which said welding situation visual synthesis electronic model comprises a circuit for determining the position of the welding electrode simulator with respect to said screen of said display having an input connected to said error separation circuit.

14. A welder's trainer as claimed in claim 13, in which said circuit determining the position of said welding electrode simulator with respect to said screen of said display has a sensitive element having an output, an amplifier having an input connected to said output of said sensitive element and having an output, and a comparator having an input connected to said output of said amplifier and an output.

15. A welder's trainer as claimed in claim 12, in which said welding situation visual synthesis electronic model comprises a circuit measuring the signal corresponding to the welding speed having an input connected to said output of said error separation circuit and having an output connected to said heat balance electronic model.

16. A welder's trainer as claimed in claim 15, in which said circuit for determining a signal corresponding to the welding speed comprises:
  a first logarithmic amplifier having an input and an output;
  a second logarithmic amplifier having an input and an output;
  a second amplifier having an input connected to said output of said first logarithmic amplifier and having an output;

a third amplifier having an input connected to said output of said second logarithmic amplifier and an output;

a first antilogarithmic amplifier having an input connected to said output of said second amplifier and an output;

a second antilograrithmic amplifier having an input connected to said output of said third amplifier and an output;

an adder having a first input connected to said output of said first antilograrithmic amplifier, a second input connected to said output of said second antilogarithmic amplifier, and having an output;

a third logarithmic amplifier having an input connected to said output of said adder and an output;

a fourth amplifier having an input connected to said output of said third logarithmic amplifier and an output;

a third antilograrithmic amplifier having an output connected to said output of said fourth amplifier and an output, which is the output of said whole circuit for determining the signal corresponding to the welding speed.

17. A welder's trainer as claimed in claim 16, in which said channel producing a weldpool tracking error signal comprises:

a tracking error signal separation circuit having a thirteen AND element having inputs and outputs; a fourteenth AND element having an input and an output, a fifteenth AND element having a first input, a second input and an output;

a pulse counter having a first input connected to said output of said thirteenth AND element, a second input connected to said output of said fifteenth AND element, and an inverse output connected to said outputs of said fourteenth AND element;

a fifth NOT element having an input connected to said second output of said fourteenth AND element, and an output connected to said input of said fifteenth AND element; said inputs of said thirteenth AND element and said second input of said fifteenth AND element being an input of said error signal producing channel.

18. A welder's trainer as claimed in claim 12, in which said circuit for separation of error signals indicating the deviation of said welding electrode simulator from the weldpool image center comprises a channel for horizontal data processing and a channel for vertical data processing; each of said channels having the following components connected in series:

a digital delay line, a preprocessing circuit, a circuit determining the error value and for controlling the weldpool image motion, a digital-to-analog converter; and the output of said digital-to-analog converter and the output of said circuit for determining the error value and for controlling the weldpool image motion are data outputs of said error signal separation circuit.

19. A welder's trainer as claimed in claim 18, in which said preprocessing circuit comprises:

a second trigger having an input and an output;

a third trigger having an input and an output;

a fourth trigger having a first input, a second input and an output;

a third comparison circuit having a first input, a second input and an output; said output of said second trigger connected to said first input of said fourth trigger and to said first input of said third comparison circuit; said output of said third trigger connected to said second input of said fourth trigger and to said second input of said third comparison circuit; said inputs of said second and third triggers are the inputs of said reprocessing circuit.

20. A welder's trainer as claimed in claim 18, in which said circuit for determining the error value and for controlling the weldpool image motion comprises:

a bidirectional counter having digital outputs and an input;

an OR element having a plurality of inputs, to which said digital outputs of said bidirectional counter are connected digitwise, and an output;

a fourth NOT element having an output and an input connected to said output of said fourth OR circuit;

a ninth AND element having an input and an output;

a tenth AND element having an input and an output, said outputs of said ninth and tenth AND elements being connected to said input of said bidirectional counter;

an eleventh AND element having an input and an output;

a twelfth AND element having an input and an output; said outputs of said eleventh and twelfth AND elements are the outputs of said whole error value determining circuit;

said inputs of said ninth, tenth, eleventh and twelfth AND elements connected to said output of said fourth NOT element and to said output of said welding situation simulation process timing unit.

21. A welder's trainer comprising:

a welding situation simulation unit having an input and made in the form of a television-type display;

a welding electrode simulator having an input and an output;

a heat balance electronic model having an input and an output;

a welding situation visual synthesis electronic model having inputs and a first and a second outputs; said first output of said welding situation visual synthesis electronic model connected to said display;

a training control and monitoring unit having an input and a first output connected to said input of said welding electrode simulator, a second output connected to said input of said heat balance electronic model, a third output connected to said display, and a fourth output to said input of said welding situation visual synthesis electronic model;

said welding situation visual synthesis electronic model comprising:

a weldpool image generation unit having inputs and an output connected to said input of said training control and monitoring unit;

a grooving image generation unit having an input and an output;

a welding process sparking image generation unit having an input connected to said output of said weldpool image generation unit and to said output of said heat balance electronic model, and an output connected to said input of said welding electrode simulator and to said display;

a welding joint image generation unit having an input connected to said output of said weldpool image generation unit and an input connected to said input of said welding process sparking image generation unit;

a welding situation simulation process timing unit having an input and an output connected to said input of said weldpool image generation unit and to said input of said welding joint image generation unit and to said input of said welding process sparking image generation unit;

a circuit for separation of error signals indicating a deviation of said welding electrode simulator from a weldpool image generation unit center on said screen of said display, the separation circuit connected to said training control and monitoring unit, to said timing unit, to said weldpool image generation unit, and to said welding joint image generation unit.

22. A welder's trainer as claimed in claim 21, in which said weldpool image generation unit comprises a weldpool image former having an input and an output; a weldpool image center former having an input and an output; a weldpool image raster horizontal sampling counter having an input, a group of outputs and an individual output connected to said input of said weldpool image former; a weldpool image raster vertical sampling counter having an input, a group of outputs and an individual output connected to said input of said weldpool image generation unit; a first AND element having a first input, a second input and an output connected to said input of said raster horizontal sampling counters second AND element having a first input, a second input and an output connected to said input of said raster vertical sampling counter; a first trigger for starting the weldpool image raster having a first input, a second input and an output connected to said first input of said first AND element; said input of said first trigger connected to said output of said raster horizontal sampling counter: a second trigger for starting the weldpool image raster having first input, a second input and an output connected to said first input of said second AND element; said first input of the second trigger connected to said output of said raster vertical sampling counter; said second input of said first AND element, said second input of said second AND element, said second input of said first trigger and said second input of said second trigger are inputs of said weldpool image generation unit; said output of said weldpool image generation unit and said group of outputs of said raster horizontal sampling counter and said raster vertical sampling counter are outputs of the whole said weldpool image generation unit;

said grooving image generation unit comprises a grooving image former having an input and an output; a grooving raster horizontal sampling counter having an input, a group of outputs and an individual output connected to said input of said grooving image generation unit; a grooving image raster vertical sampling counter having an input, a group of outputs and an individual output connected to said input of said grooving image generation unit; a third AND element having first input, a second input and an output connected to said input of said grooving image raster horizontal sampling counter a fourth AND element having first input, a second input and an output connected to said input of said grooving image raster vertical sampling counter; a first trigger for starting the grooving image raster having first input, a second input and an output connected to said first input of said third AND element; said first input of the first trigger for starting the grooving image raster connected to said output of said grooving image raster horizontal sampling counter; a second trigger for starting the grooving image raster having first input, a second input and an output connected to said first input of said fourth AND element; said first input of said second trigger for starting the grooving image raster connected to said output of said grooving image raster vertical sampling counter; said second input of said third AND element; said second input of said fourth AND element, said second input of said first trigger for starting the grooving image raster and said second input of said second trigger for starting the grooving image raster are inputs of said grooving image generation unit; said output of said grooving image generation unit and said group of outputs of said raster horizontal sampling counter and said raster vertical sampling counter are outputs of the whole said grooving image generation unit;

said welding process sparking image generation unit comprises a sparking path former having inputs and an output;

a spark position counter having an output connected to said inputs of said sparking path former;

a pseudo-random pulse train generator having an input connected to said output of said 98 spark position counter and having an output connected to said inputs of said former; a master pulse generator having an input; a raster horizontal sampling counter having an input connected to said output of said master pulse generator and having an output; a raster vertical sampling counter having an input connected to said output of said raster horizontal sampling counter.

23. A welder's trainer as claimed in claim 22, in which said welding joint image generation unit comprises an address register having an output; an input data switching device; an output data switching device; a memory device having inputs connected to said output of said address register and to said input data switching device and an output connected to said output data switching device; a unit shaping the path of motion of the weldpool image having an output connected to said input of said welding situation simulation process timing unit; a circuit determining the position of said welding electrode simulator with respect to said screen of said display having an output connected to said output of said error signal separation circuit; a circuit determining the signal corresponding to the welding speed having an input connected to said output of said error signal separation circuit and an output connected to said welding process heat balance electronic model;

said welding situation visual synthesis electronic model comprises a video mixer having an input and an output; said input of said video mixer connected to said welding process heat balance electronic model, to said weldpool image generation unit, to said grooving image generation unit, to said welding process sparking image generation unit, to said welding joint image generation unit, and to said welding situation simulation process timing unit; said output of said video mixer connected to said display;

said training control and monitoring unit comprises an arc gap length channel; a channel of an angle of slope of said welding electrode simulator; a working time measuring channel; a welding sequence time measuring channel; an audio-frequency oscillator producing alarm and noise background signals; an electrode fusion simulation drive control channel; a channel determining the weldpool thermal conditions; a down-time measuring channel; a channel for measuring the sticking time of said welding electrode simulator; a channel producing a weldpool tracking error signal.

24. A welder's trainer as claimed in claim 23, in which said welding situation simulation process timing unit comprises: a microraster horizontal position counter having an input and an output; a microraster vertical position counter having an input and an output; a first comparison circuit having a first input connected digitwise to said output of said microraster horizontal position counter, a second input connected digitwise to said output of said raster horizontal sampling counter, and having an output; a second comparison circuit connected digitwise to said output of said microraster vertical position counter, a second input connected digitwise to said output of said raster vertical sampling counter, and an output; a fifth AND element having inputs connected digitwise to said output of said first comparison circuit, and an output; a sixth AND element having an output and inputs connected digitwise to said output of said second comparison circuit; a switching device controlling the microraster movement comprising an operating mode selector switch and having outputs connected in pairs to said inputs of said microraster horizontal position counter and said microraster vertical position counter, said output of said fifth AND element and said output of said sixth AND element being data inputs of said welding situation simulation process timing unit;

said unit shaping the path of motion of the weldpool image comprises: a starting switch; a first pulse generator producing pulses corresponding to the speed of the weldpool image along the horizontal axis having an input; a first switching circuit having an input, a control input and an output; a second switching circuit having an input, a control input and an output; said input of said first switching circuit and said input of said second switching circuit connected through said starting switch to said output of said first pulse generator; a second pulse generator producing pulses corresponding to the speed of the weldpool image along the vertical axis having an output; a third switching circuit having an input, a control input and an output; said input of said third switching circuit and said input of said fourth switching circuit connected through said starting switch to said output of said second pulse generator; a third pulse generator producing pulses corresponding to the step of motion of the weldpool image having an output; a first trigger having a direct input, an inverse input and an output connected through said starting switch to said output of said third pulse generator; an inverter having an output and an input connected through said starting switch to said output of said third pulse generator; a seventh AND element having a first input connected to said direct output of said first trigger; a second input connected through said starting switch to said output of said third pulse generator, and the weldpool image path switch connected to said output of said third pulse generator, to said output of said inverter and to said output of said seventh and said eighth AND elements, a third NOT element having an input connected to said weldpool image path switch and an output connected to said control inputs of said third and fourth switching circuits; a switching device for changing the direction of motion of the weldpool image connected to said weldpool image path switch and to said control inputs of said first and second switching circuits;

said circuit for determining the position of said welding electrode simulator with respect to said screen of said display comprises: a sensitive element having an output; an amplifier having an input connected to said output of said sensitive element, and an output; and a comparator having an input connected to said output of said amplifier, and having an output.

25. A welder's trainer as claimed in claim 23, in which said circuit determining the signal corresponding to the welding speed comprises: a first logarithmic amplifier having an input and an output; a second logarithmic amplifier having an input and an output; a second amplifier having an input connected to said output of said first logarithmic amplifier and an output; a third amplifier having an input connected to parameters to be monitored of said second logarithmic amplifier, and an output; a first antilogarithmic amplifier having an input connected to said output of said second amplifier; a second antilograrithmic amplifier having an input connected to said output of said third amplifier, and an output; an adder having a first input connected to said output of said first antilogarithmic amplifier, a second input connected to said output of said second antilogarithmic amplifier, and an output; a third logarithmic amplifier having an input connected to said output of said adder, and an output; a fourth amplifier having an input connected to said output of said third logarithmic amplifier, and an output; a third antilogarithmic amplifier having an input connected to said output of said fourth amplifier, and an output being an output of said whole circuit determining the signal corresponding the welding speed.

26. A welder's trainer as claimed in claim 23, in which said preprocessing circuit comprises: a second trigger having an input and an output; a third trigger having an input and an output; a fourth trigger having a first input, a second input and an output; a third comparison circuit having a first input, a second input and an output; said output of said second trigger connected to said first input of said fourth trigger and to said first input of said third comparison circuit; said output of said third trigger connected to said second input of said fourth trigger and to said second input of said third comparison circuit, said inputs of said second and third triggers being inputs of said whole preprocessing circuit;

said circuit for determining the error value and controlling the weldpool image movement comprises: a bidirectional counter having digitwise outputs and an input; an OR element having a plurality of inputs to which said digitwise outputs of said bidirectional counter are connected and having an output; a fourth NOT element having an output and an input connected to said output of said fourth OR element; a ninth AND element having an input and an output; a tenth AND element having an input and an output; said outputs of said ninth and tenth AND elements connected to said input of said bidirectional counter; an eleventh AND element having an input and an output; a twelfth AND element having an input and an output, said outputs of said eleventh and twelfth AND elements being outputs of said whole error value determining circuit; said inputs of said ninth, tenth, eleventh and twelfth AND elements are connected to said output of said fourth AND element and to said output of said welding situation simulation process timing unit;

said channel producing an error signal by tracking the weldpool image comprises: a tracking error signal separation circuit having a thirteenth AND element having an input and an output; a fourteenth AND element having an input and an output; a fifteenth AND element having a first input, a second input and an output; a pulse counter having a first input connected to said output of said thirteenth AND element, a second input connected to said output of said fifteenth AND element, a direct output and an inverse output connected to said output of said fifteenth AND element and direct and inverse outputs connected to said inputs of said fourteenth AND element; a fifth NOT element having an input connected to said second output of said fourteenth AND element and an output connected to said input of said fifteenth AND element, said input of said thirteenth AND element and said second input of said fifteenth AND element being the inputs of said error signal generation channel.

27. A welder's trainer as claimed in claim 26, comprising a circuit controlling the weldpool image brightness depending on the welding process thermal conditions, said circuit being connected to the input of said video mixer.

28. A welder's trainer as claimed in claim 21, in which said welding joint image generation unit comprises:
an address register having an output; an input data switching device; a memory device having inputs connected to said output of said address register and to said input data switching device and an output connected to said input data switching device;
a unit shaping the path of motion of the weldpool image having an output connected to said input of said welding situation simulation process timing unit;
a circuit for determining the location of said welding electrode simulator with respect to said display connected to said input of said error separation circuit;
a circuit for determining the signal corresponding to the welding speed having an input connected to said output of said error signal separation circuit and having an output connected to said welding process heat balance electronic model.

29. A welder's trainer as claimed in claim 28 comprising a circuit for controlling the weldpool image brightness depending on the thermal conditions of the welding process connected to the input of said video mixer.

30. A welder's trainer as claimed in claim 21, in which said welding situation visual synthesis electronic model comprises a video mixer having an input and an output; said input of said video mixer connected to said welding process heat balance electronic model, to said weldpool image, to said grooving image generation unit, to said welding process sparking image generation unit, to said grooving image former and to said welding situation simulation process timing unit; said output of said video mixer connected to said display.

31. A welder's trainer as claimed in claim 21, in which said training control and monitoring unit comprises:
an arc gap length channel;
a channel of angle of slope of said welding electrode simulator;
a working time determining channel;
a channel for determining the welding seance time;
an audio-frequency oscillator of alarm and noise background signals;
a channel for controlling the electrode fusion drive;
a pulse generator;
a channel for determining the weldpool thermal conditions;
a downtime measuring channel;
a channel for measuring the sticking time of said welding electrode simulator;
a channel producing an error signal following the tracking of the weldpool image.

* * * * *